Dec. 7, 1948.　　　W. W. POTTER ET AL　　　2,455,876
MACHINE TOOL
Filed May 26, 1944　　　15 Sheets-Sheet 1

INVENTORS
W. W. POTTER
A. J. FULLER
BY
ATTORNEY

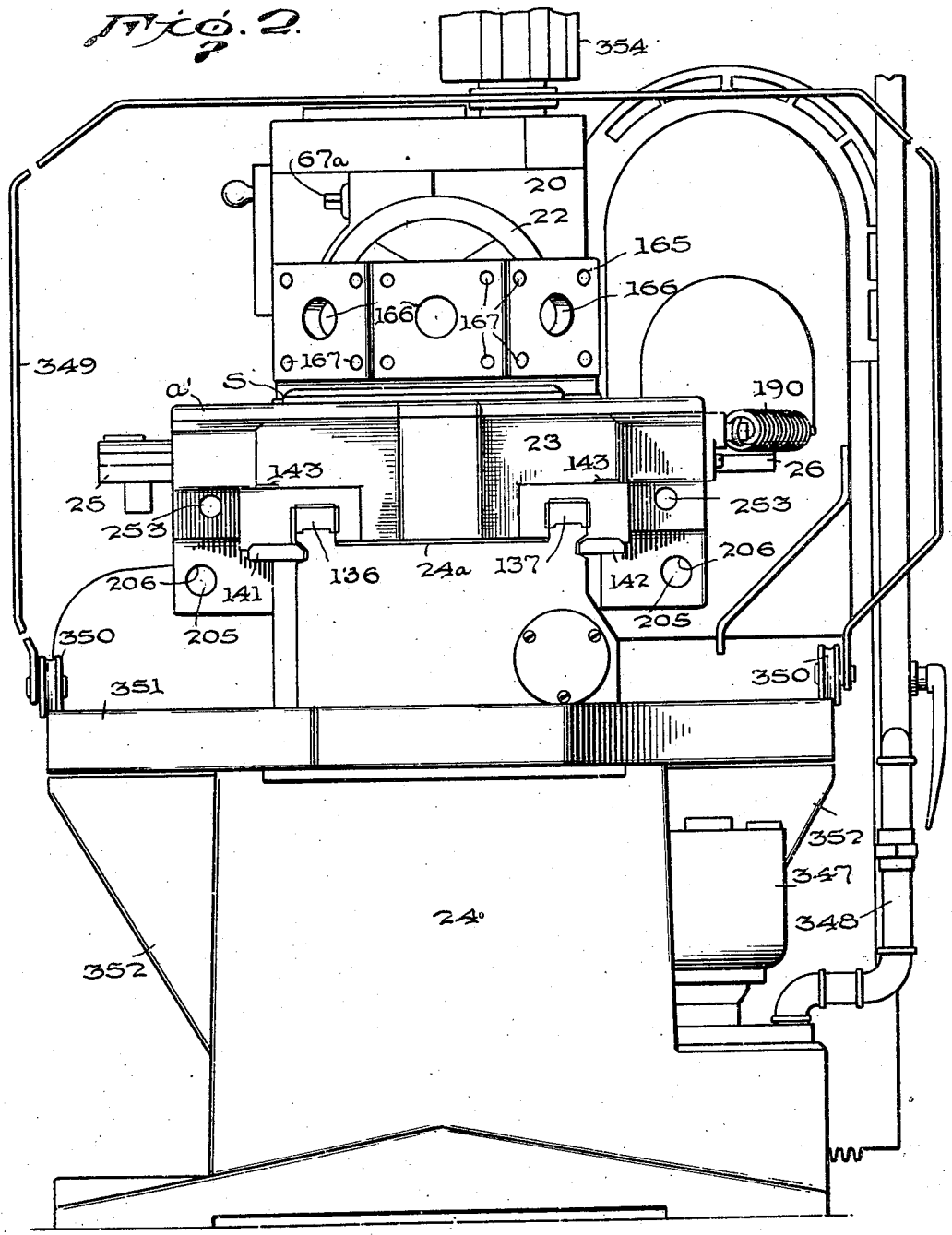

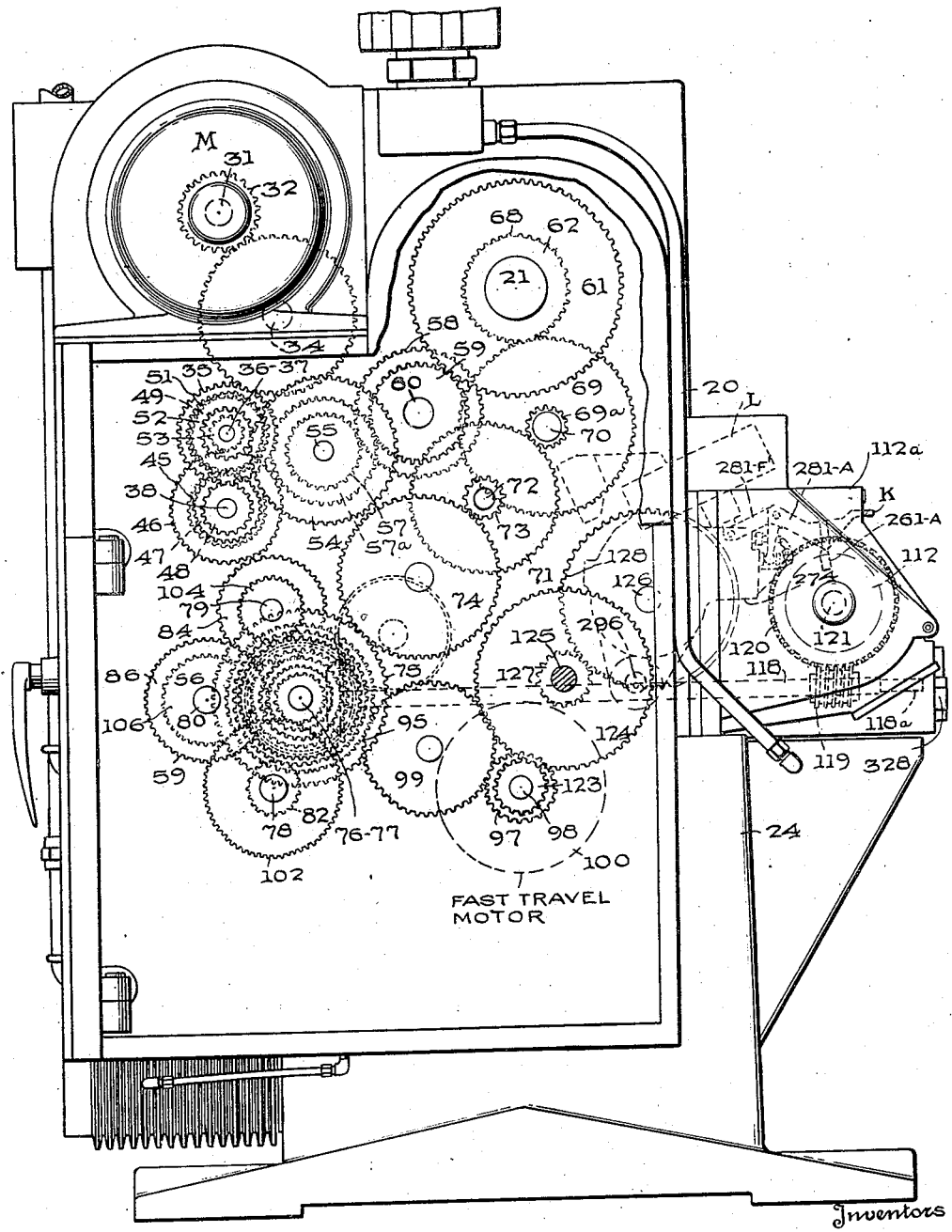

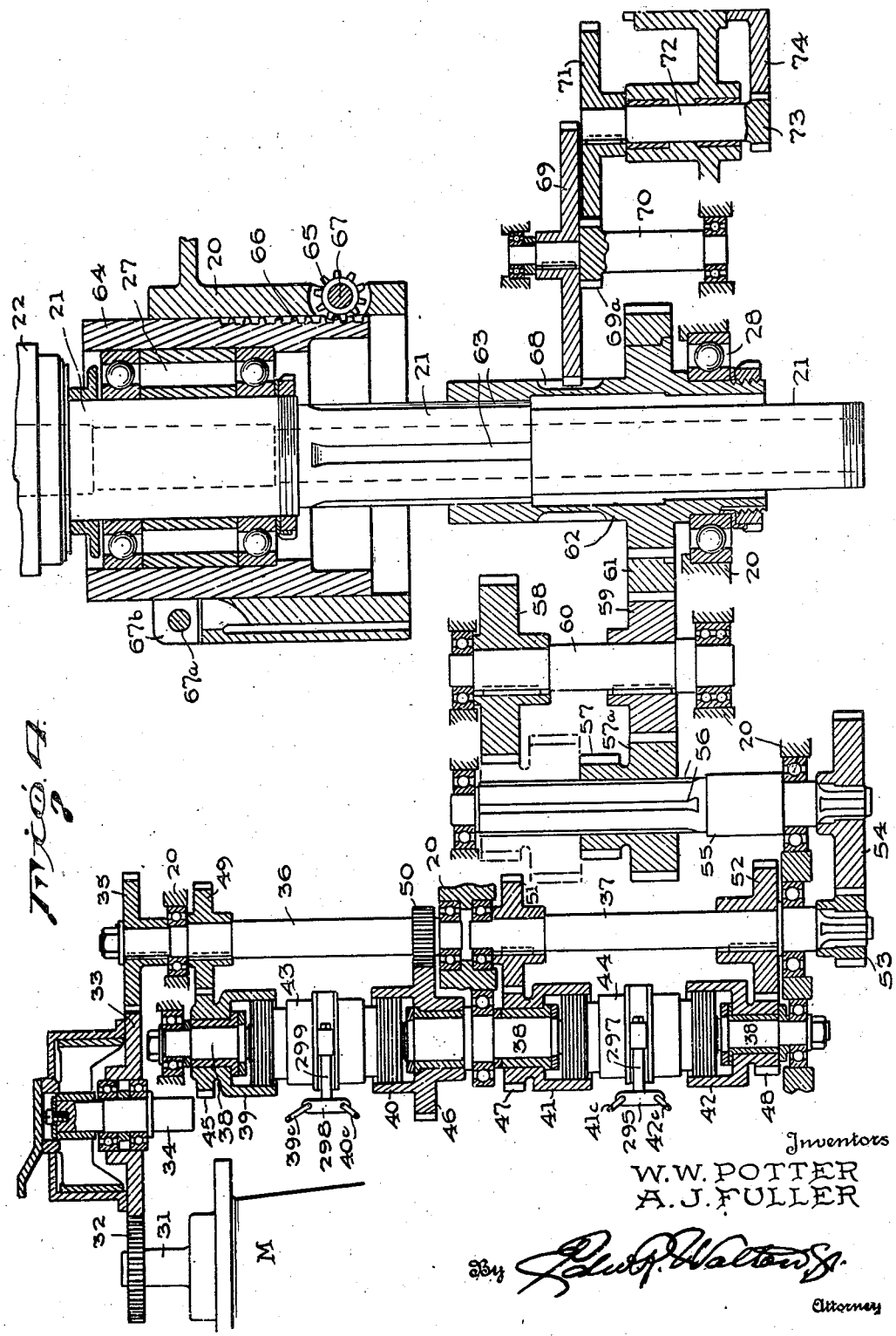

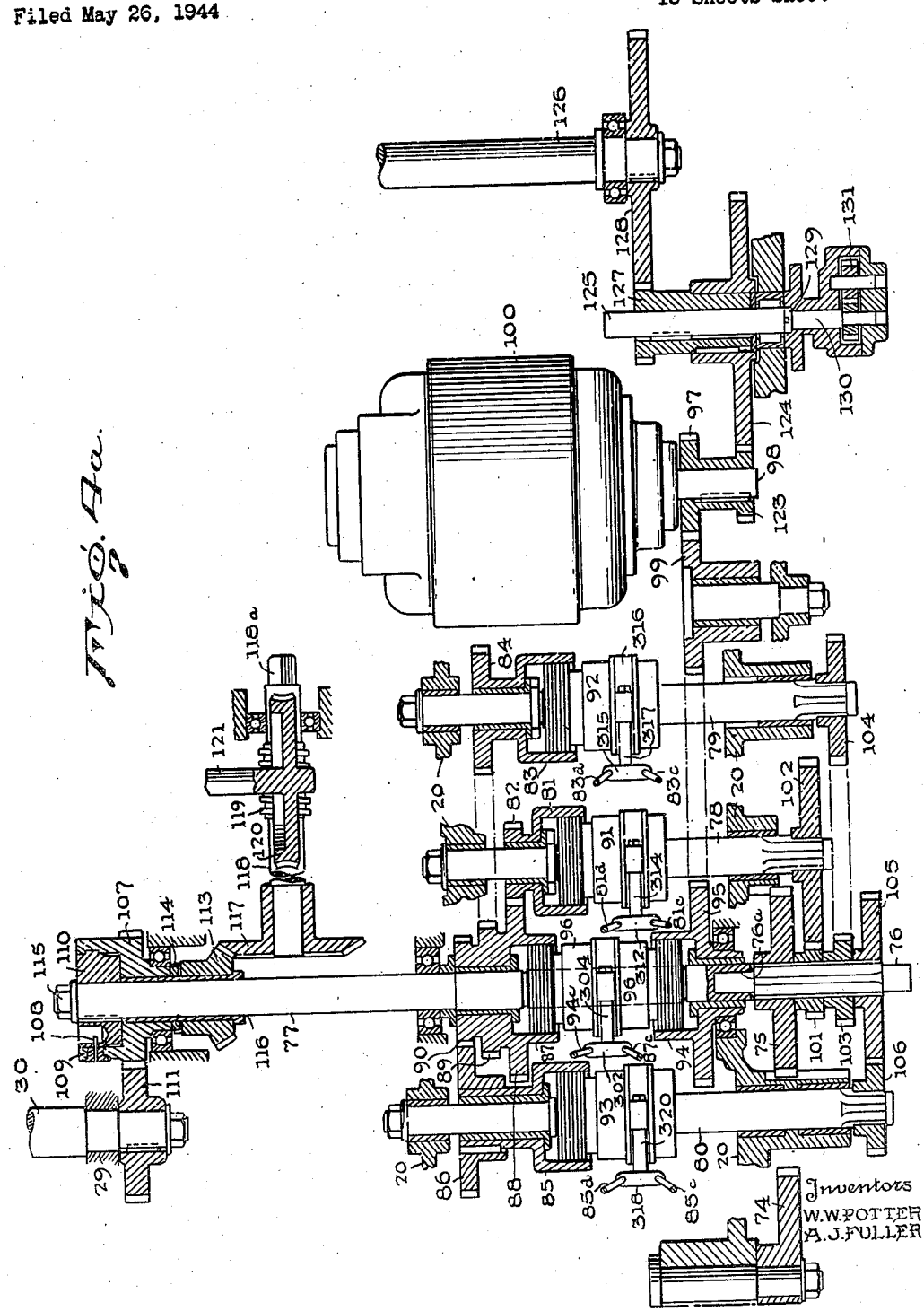

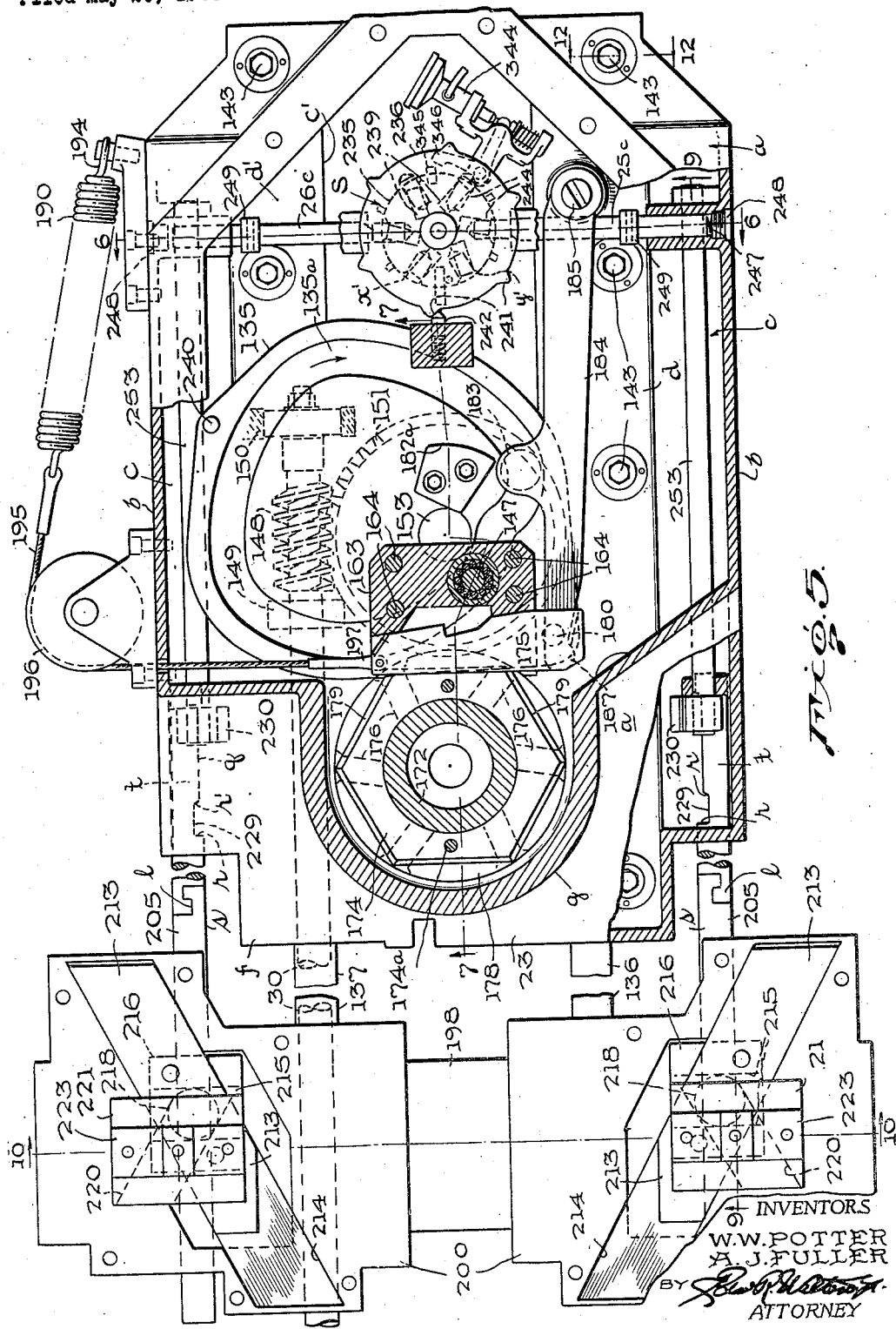

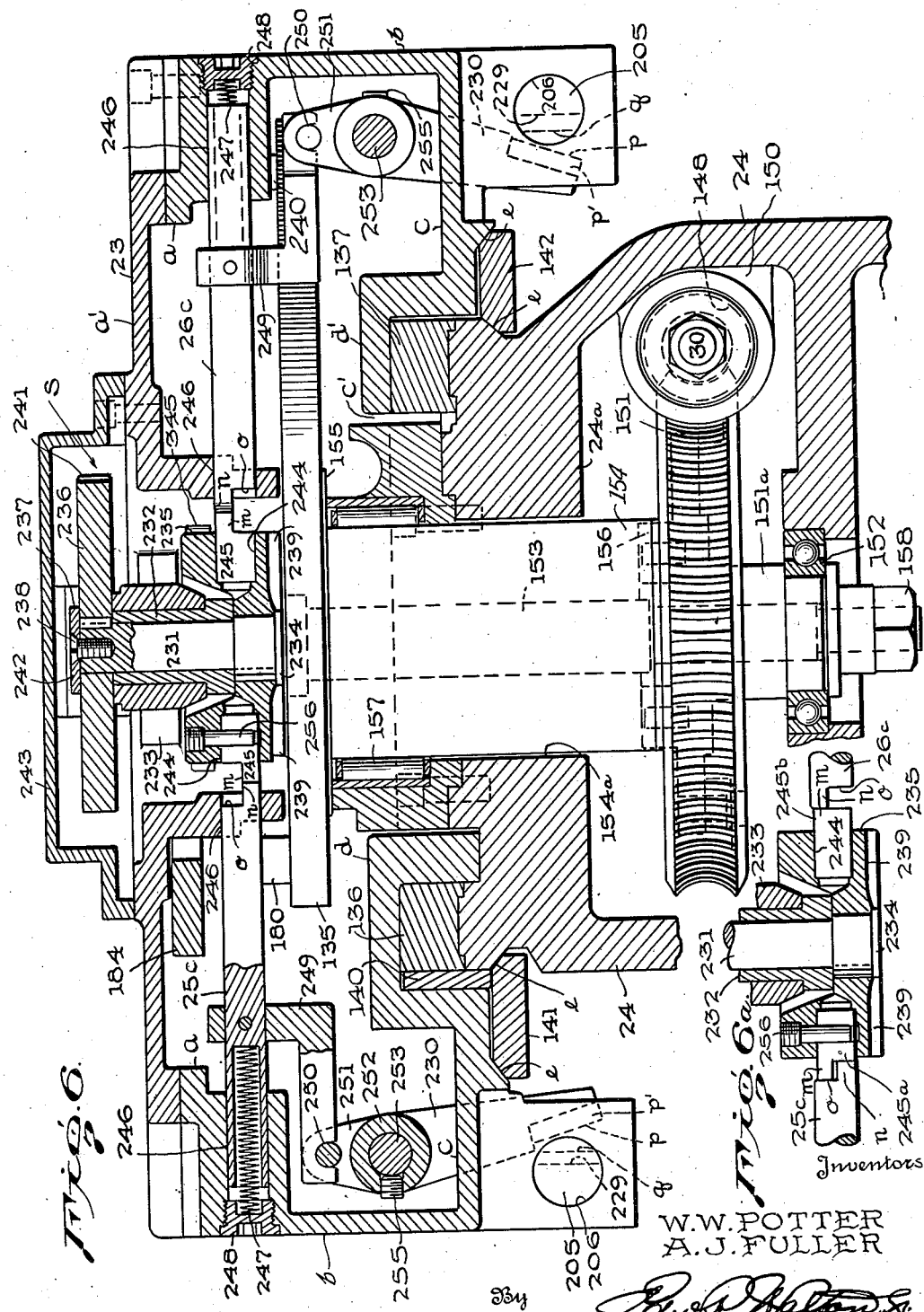

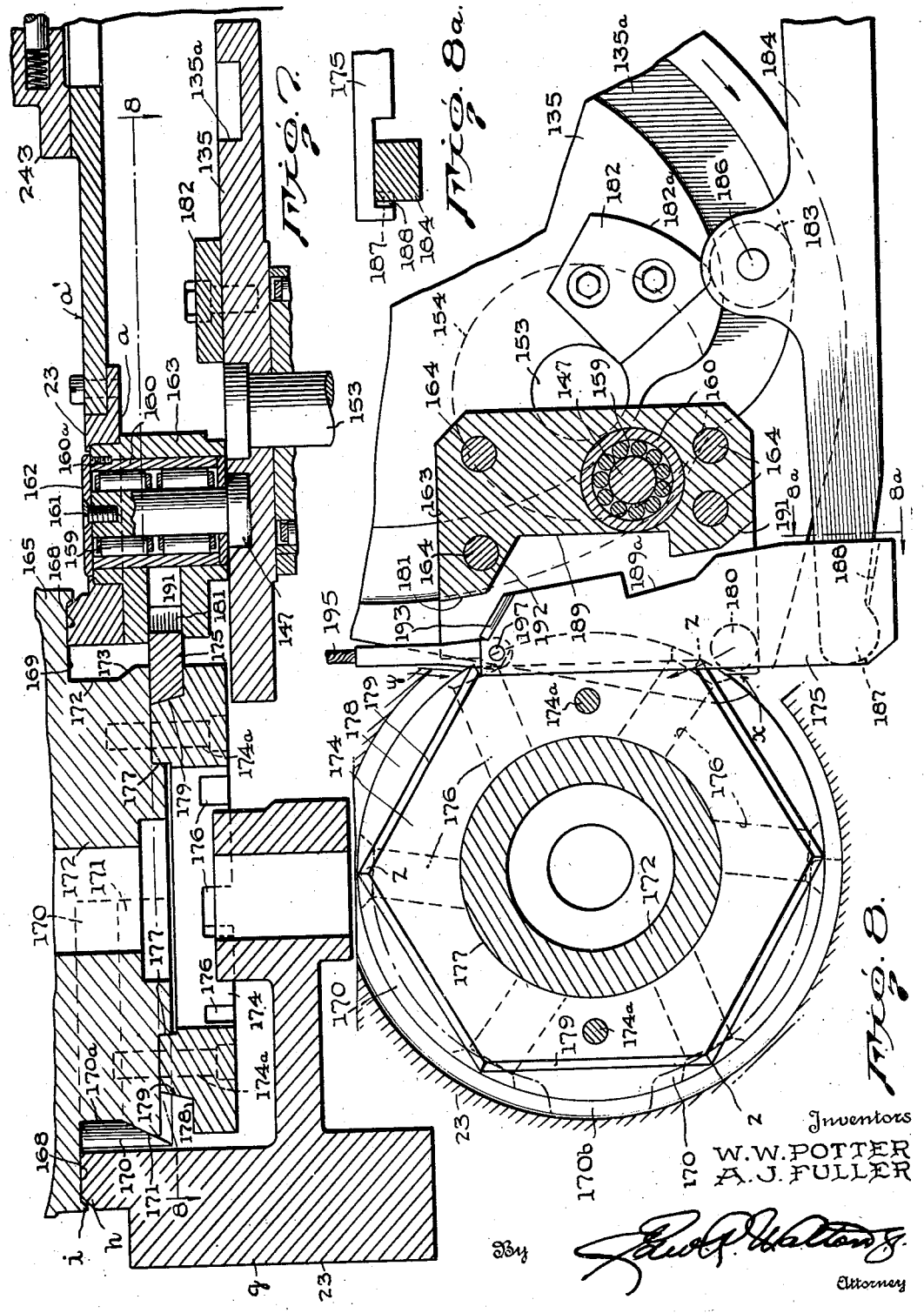

Dec. 7, 1948.  W. W. POTTER ET AL  2,455,876
MACHINE TOOL
Filed May 26, 1944  15 Sheets-Sheet 9
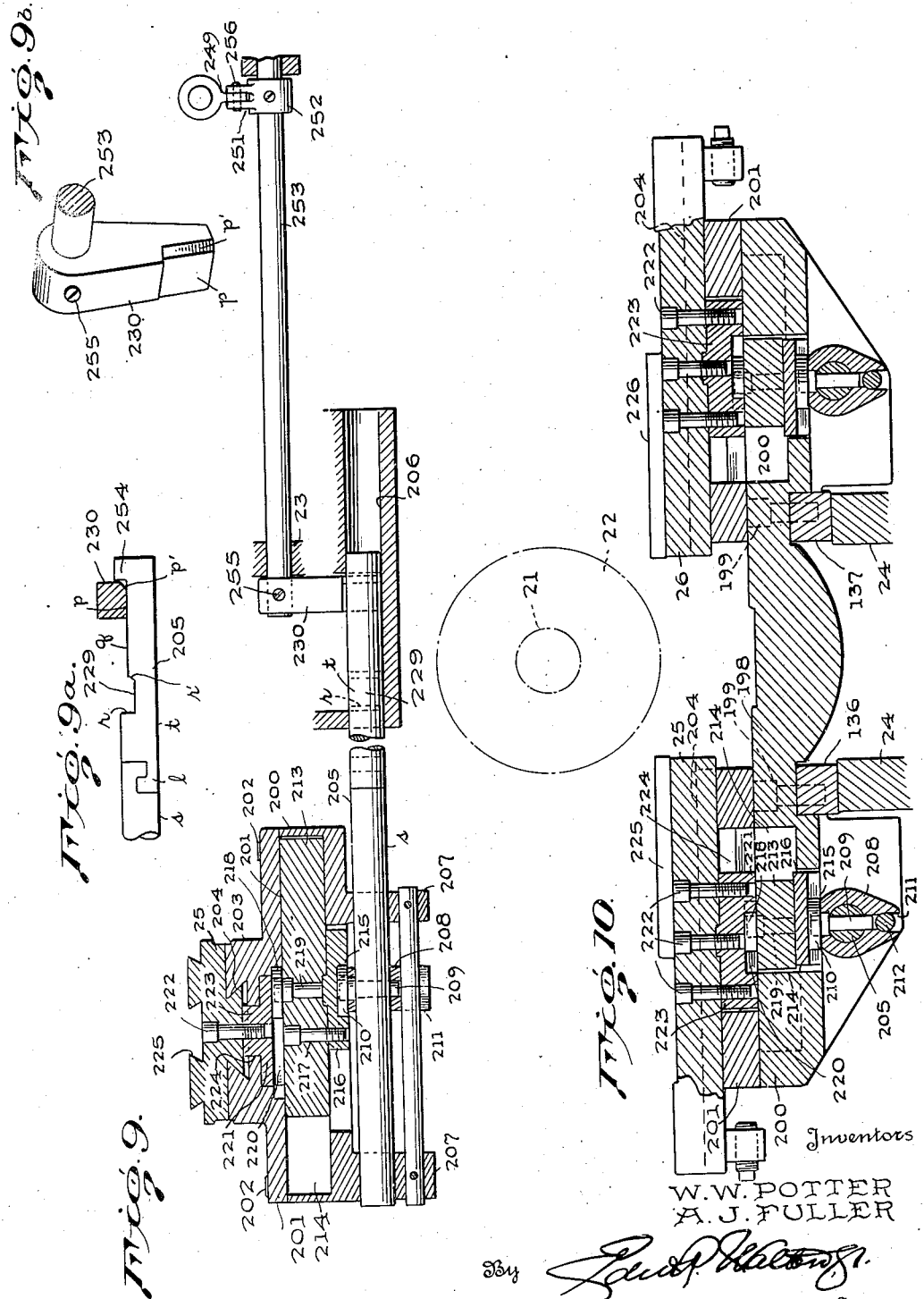
Inventors
W. W. POTTER
A. J. FULLER
By
Attorney Dec. 7, 1948.  W. W. POTTER ET AL  2,455,876
MACHINE TOOL
Filed May 26, 1944  15 Sheets-Sheet 10
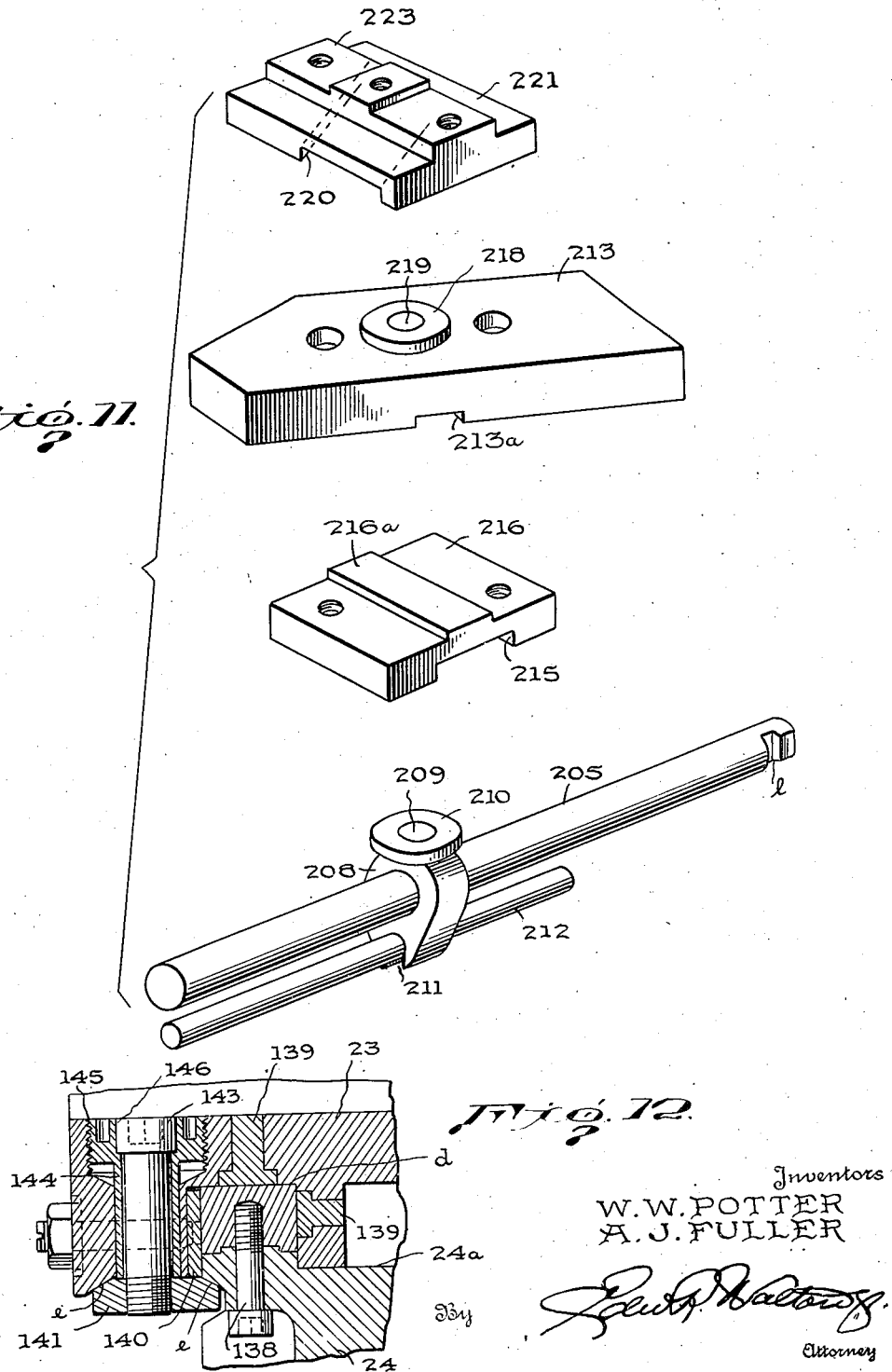

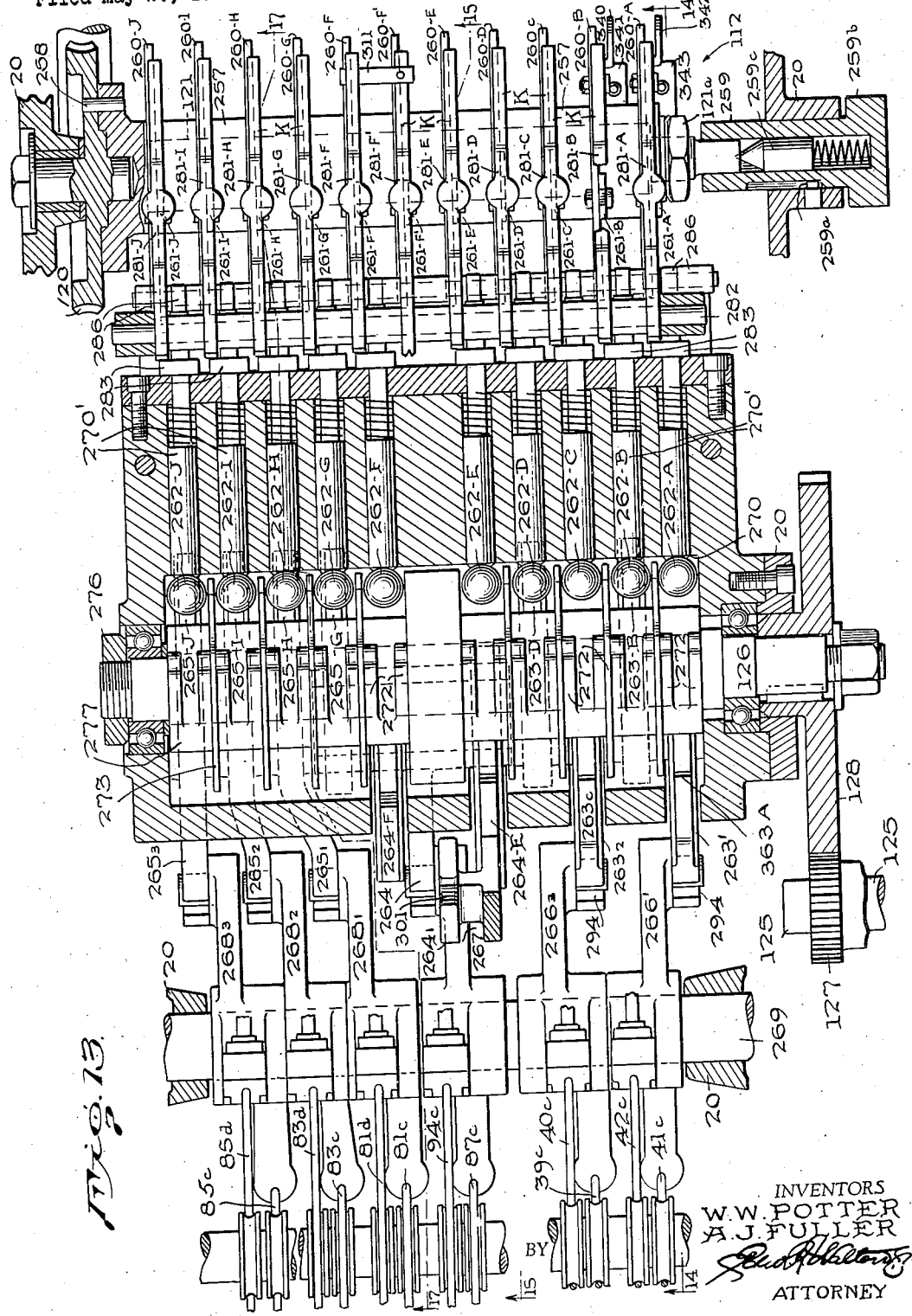

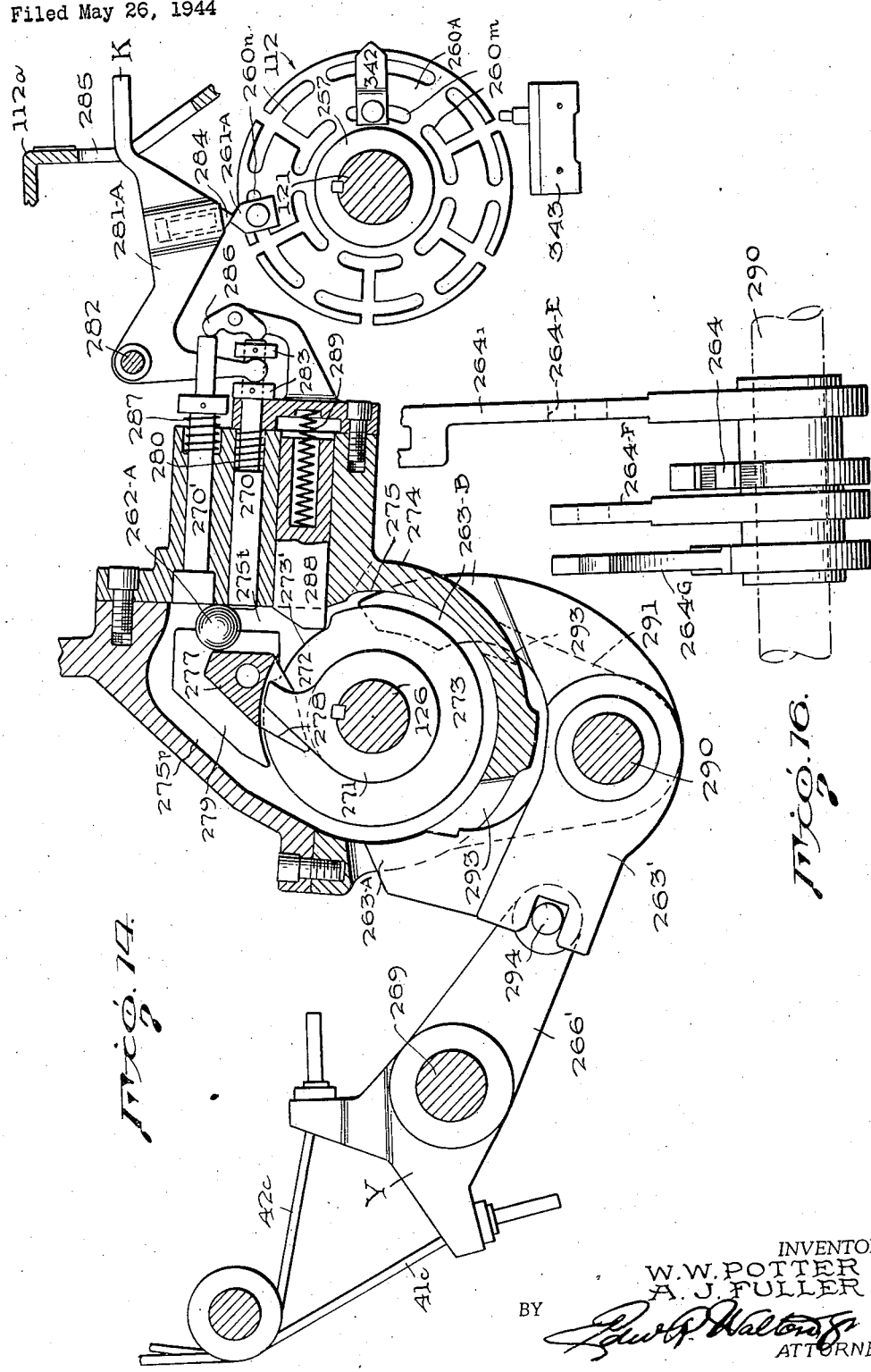

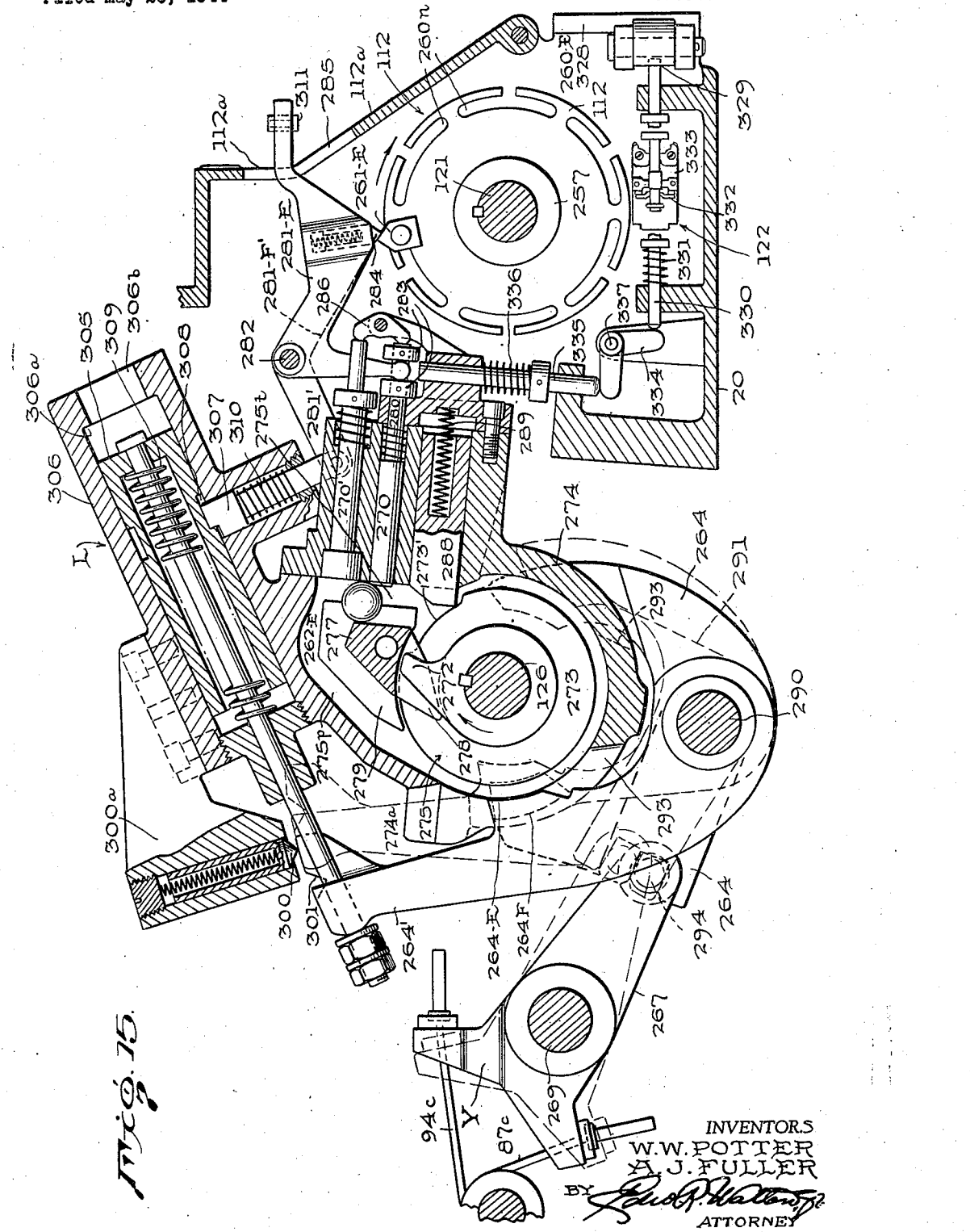

Dec. 7, 1948.   W. W. POTTER ET AL   2,455,876
MACHINE TOOL
Filed May 26, 1944   15 Sheets-Sheet 14
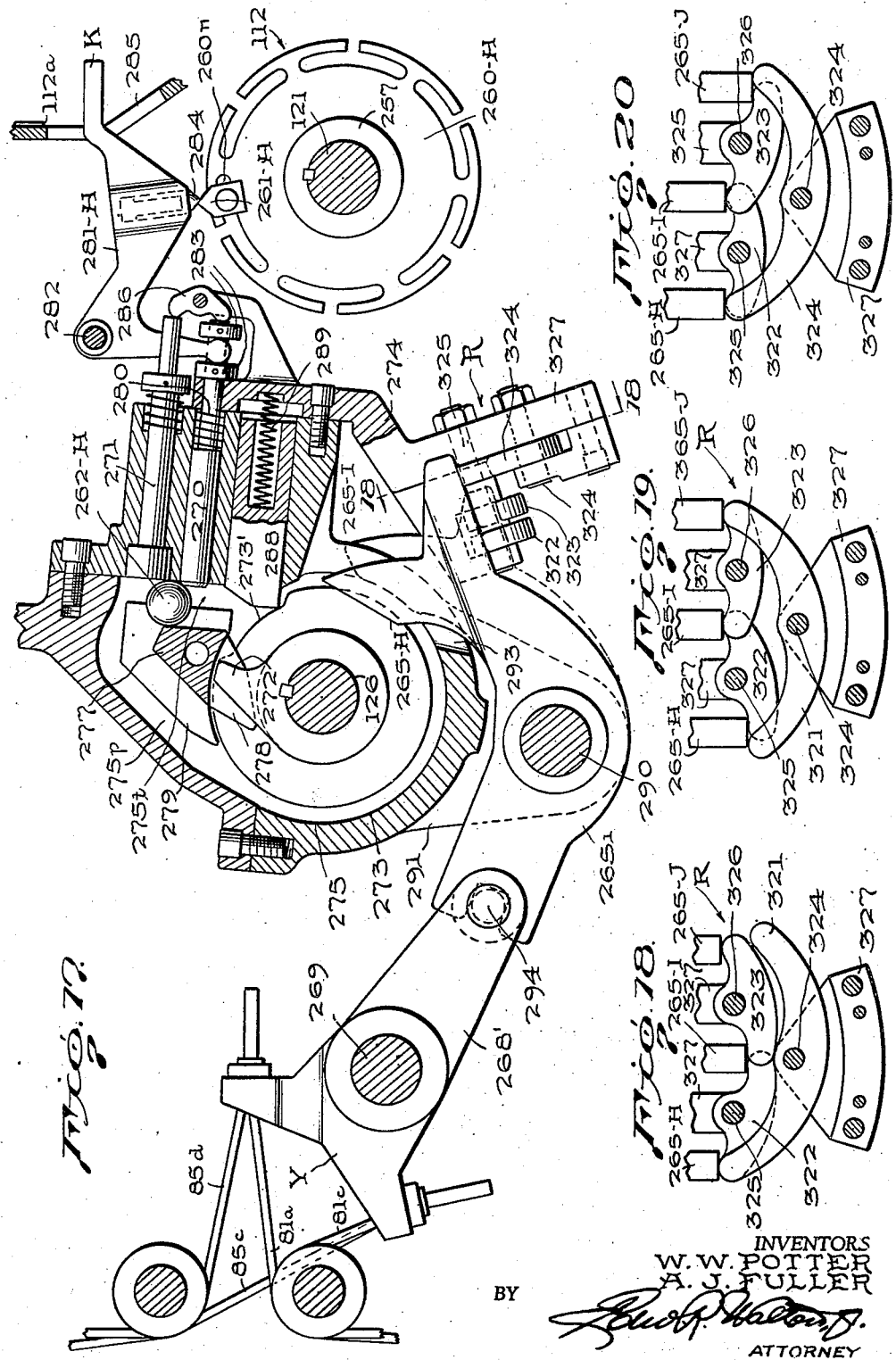

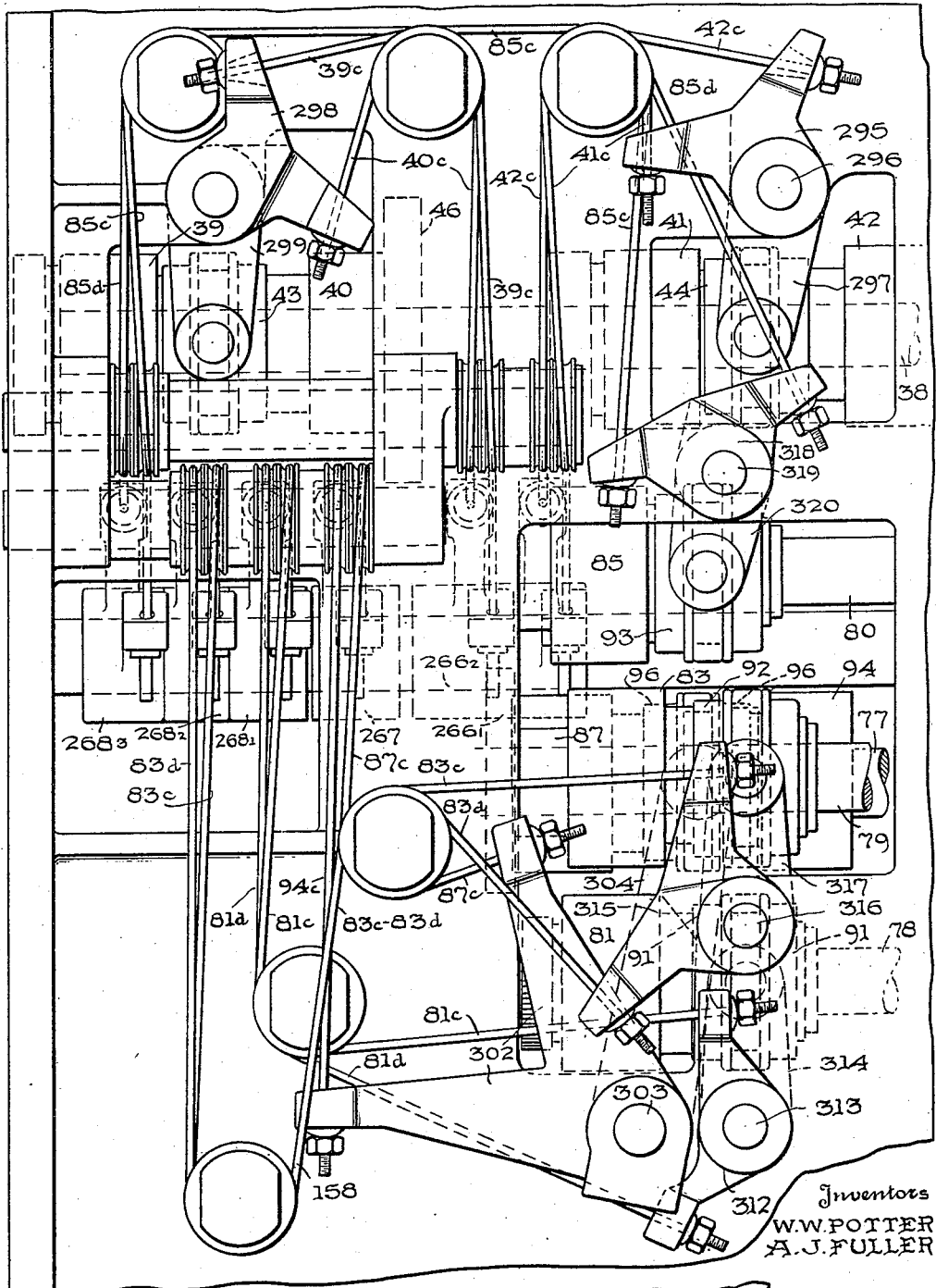

Patented Dec. 7, 1948

2,455,876

UNITED STATES PATENT OFFICE 2,455,876

MACHINE TOOL

William Wallace Potter and Alfred Joseph Fuller, Pawtucket, R. I., assignors, by mesne assignments, to Niles-Bement-Pond Company, West Hartford, Conn., a corporation of New Jersey Application May 26, 1944, Serial No. 537,490

18 Claims. (Cl. 29—44)

The present invention relates to machine tools and more particularly to an automatic turret lathe.

One of the broad objects of the present invention is to effect a very compact and simplified construction permitting the production of a less expensive and efficient automatic turret lathe of relatively small size for use upon small subjects or workpieces which ordinarily have been done heretofore on hand or semi-automatic lathes; but, while this is the primary object of the present invention, it can be appreciated, of course, that the machine of the present construction may be made in larger sizes.

One of the more specific objects of the invention is the elimination, in a mechanically actuated turret lathe, of the customary turret slide cam drum, of the customary timing box mechanism for the cross slides, and of the separate indexing means for the turret, and is the provision of a single disc cam by which all operations of the turret slide, cross slides, indexing of the turret are actuated thereby and controlled therefrom, thus rendering it impossible for one of said operations to be out of time with another.

The present invention provides a turret lathe, having a spindle, a turret slide and at least one cross slide reciprocable towards and away from the spindle, a driven cam member having an operative connection with the turret slide for reciprocating the latter, an operative connection between the turret slide and the cross slide or slides whereby the latter is or are reciprocated from the movement of the former, a cross slide selector mechanism operable to render the connection between the turret slide and the cross slide or slides effective or ineffective, and means on said cam member for actuating the selector mechanism.

One constructional form of turret lathe according to the invention comprises a device for locking and unlocking the turret in indexed position, means on said cam member to unlock said device, to index the turret and to cause said device to again lock the turret in indexed position at a predetermined position of the turret slide. In the same lathe the driven cam member is a disc lying in the same plane with and within the turret slide and having a cam path in a surface thereof into which extends a follower carried by the turret slide, and the operative connection between the turret slide and the cross slides inclus a wedge-cam power transmission means.

The above mentioned lathe comprises a front and a rear cross-slide and a cross-slide pre-selector device actuated from said disc cam whereby either the front or rear cross-slide, or both simultaneously, may be brought into operation or released from operation in connection with any or all of the operative positions of the tools on the turret faces, the movement of the cross-slides being derived from the movements of the turret slide for the feeding movement as well as for the return movement of the cross slides.

A further feature of this lathe is that the transmission of power from the turret slide to each cross-slide is accomplished by a multiple rectilinear wedge cam unit, each transmitting rectilinear reciprocating motion to one of the cross slides which moves at substantially right angles to the direction of movement of a reciprocating member carried by the turret slide. The advantages of this cam arrangement are that the cross slides are actuated and controlled positively and accurately and with a maximum of smooth motion so essential in the machining of metal parts, and eliminates a number of required machined and fitted parts as well as the necessity for complicated timing devices between the main or turret slide and the cross slide for controlling the cross slides independently of other devices of the machine—all making for compactness, simplicity of manufacture, accuracy in operation, ease in assembly and maintenance and manipulation by any operator.

A slip-coupling joint is provided in the operating mechanism between the turret slide and the cross slides, whereby either the turret slide or the cross slide may be completely removed from the machine without disturbing the other or its operating mechanism.

With the above objects in view, and others which will be apparent from the specification and drawings, the invention resides in the combination of sundry features of construction and organization as will be herein more completely described and which, as one example, are shown in the accompanying drawings which show the preferred embodiment of the invention as at present devised.

In the drawings:

Figure 2 is a rear end view of the machine as shown in Fig. 1, and looking from the right-hand end of Fig. 1;

Figure 3 is an end view of the headstock end of the machine, looking from the left-hand of Fig.

Figure 1:
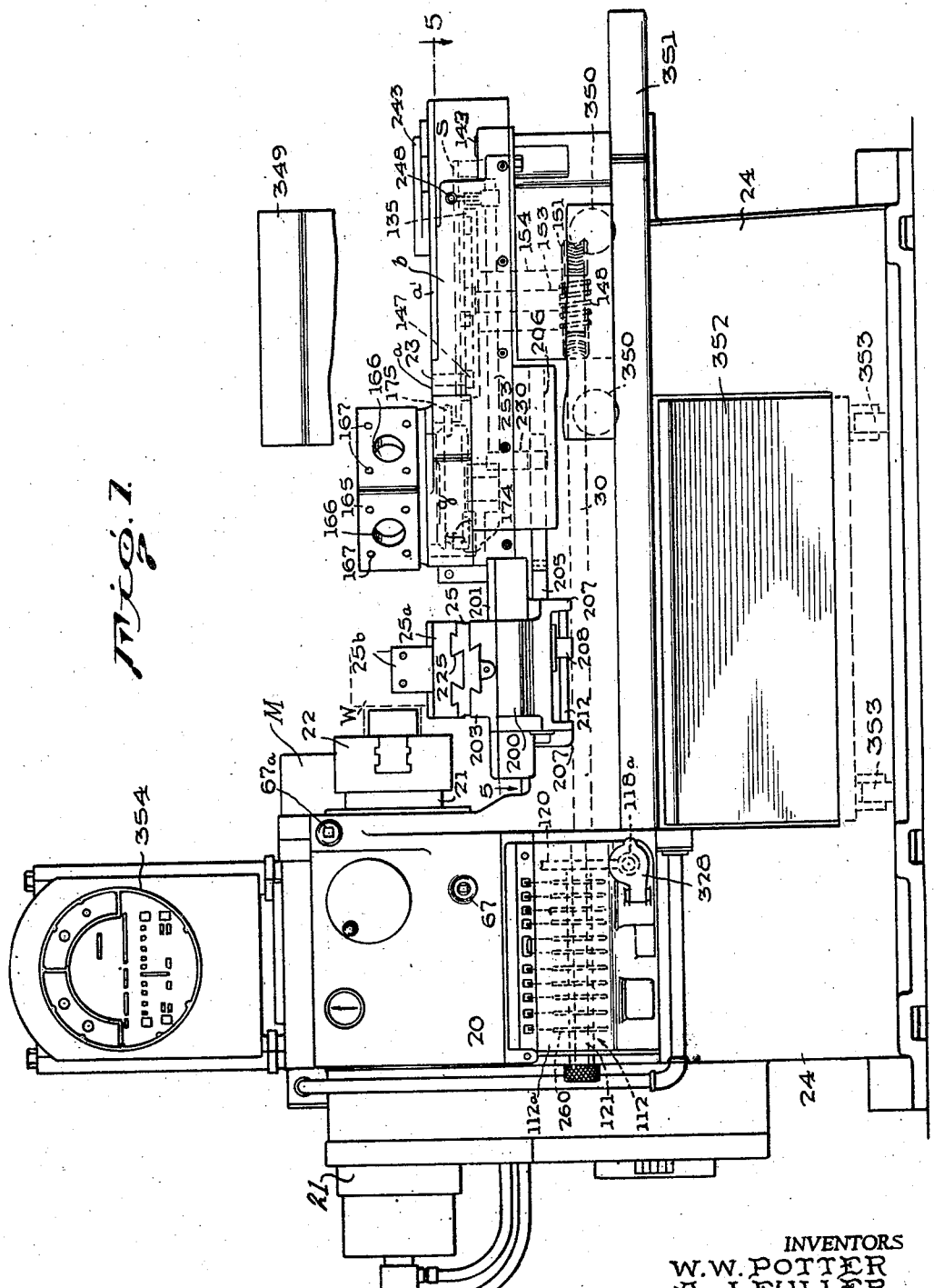
Figure 1 is a front side elevation of a machine tool constructed in accordance with the present invention.

1 with a portion of the casing broken away to illustrate the gear assembly in the headstock end of the machine;

Figures 4 and 4a are to be read together and illustrate the layout of the gearing for driving the spindle and the tool slides, this gearing showing the disposition of the clutches for automatic speed changes of both the spindle and the slides;

Figure 5 is a sectional view of the turret slide and cross slide operating means and taken substantially on the line 5—5 of Fig. 1;

Figure 6 is a transverse sectional view taken substantially on line 6—6 of Fig. 5 and illustrates the organization and arrangement of the cross slide selective means and the cam drive means for the turret slide;

Figure 6a is a fragmental sectional view of the indexible cross slide selective means and illustrates the dogs thereon in different positions;

Figure 7 is a fragmentary longitudinal sectional view of the turret slide taken substantially on line 7—7 of Fig. 5, to illustrate the turret mounting, and the details of the drive connection between the drive cam-disc and the turret slide;

Figure 8 is a horizontal sectional view taken, substantially on line 8—8 of Fig. 7;

Figure 8a is a fragmentary detailed view showing formation of the connection between the turret lock plate and its withdrawing means;

Figure 9 is a longitudinal sectional view taken substantially on line 9—9 of Fig. 5 and illustrates the cross slide operating means;

Figure 9a is a fragmentary view showing details of construction and formation of the cross slide push-rod and the latch controlled by the cross slide selector means;

Figure 9b is a perspective view of the cross slide latch itself;

Figure 10 is a transverse sectional view through the cross slide operating mechanism and is taken substantially on line 10—10 of Fig. 5;

Figure 11 is an expanded disassembled view of the cross slide actuating mechanism shown in Figs. 5, 9 and 10, the disassembled parts being shown in perspective;

Figure 12 is a sectional view of adjustable clamping means for compensating for wear on the slideways of the turret slide and is taken substantially on line 12—12 of Fig. 5;

Figure 13 is a horizontal lay-out of the ball box or motion-imparting mechanism (ball-box), which actuates the change speed device of the drive mechanism of the machine, and of the control mechanism associated therewith, the disposition of this mechanism being shown in Fig. 3 and indicated by the reference characters 112 and 274;

Figure 14 is a longitudinal sectional view taken substantially on line 14—14 of Fig. 13 and illustrates the details of construction of the control device and ball-box mechanism controlling the change speed mechanism of the spindle;

Figure 15 is a view similar to Fig. 14 and is taken substantially on line 15—15 of Fig. 13 to illustrate the details of construction of the control mechanism and the ball box mechanism controlling the operation of the clutching device interposed between the quick traverse motor and the feed change mechanism of the turret slides;

Figure 16 is an elevation of the oscillating lever 264 and its extension legs shown in Fig. 15;

Figure 17 is a view similar to Figs. 14 and 15 and is taken substantially on line 17—17 of Fig. 13 and illustrates the control device and the ball box mechanism controlling the feed-change mechanism of the cross slides;

Figures 18, 19 and 20 illustrate an interlocked device associated with the ball box mechanism for controlling the feed change mechanism of the slides so that when one clutch is engaged the other clutch or clutches will be disengaged automatically, these three figures showing different positions assumed by the interlocked device;

Figure 21 is a fragmentary elevation of the headstock, with the door shown on the lefthand side of Fig. 3 opened, to illustrate the disposition of the various clutch mechanisms and the manner of their control from the ball box mechanism shown in Fig. 13.

Throughout the specification and drawings, like characters of reference denote like and corresponding parts throughout the several views.

In order that a better understanding may be had of the detailed description which follows, a general description will now be given of the machine tool, shown in Fig. 1 of the drawings, as one type to which the invention may be applied.

This machine tool follows the general pattern of organization with the various instrumentalities found in certain of the automatic turret lathes in that, it comprises a headstock 20 in which is disposed a horizontal work spindle 21 and the variable transmission unit of the machine, a chuck 22 carried on one end of the spindle in cooperative relation with a main slide 23 (which may be a turret slide) mounted on the bed 24 disposed at one side of the headstock 20 and reciprocable to and from the chuck 22 longitudinally of the spindle and the front and rear cross slides 25 and 26 (Fig. 2), respectively, also mounted on the bed 24 between the chuck and the main slide for independent or simultaneous reciprocal movement at substantially right angles to the movement of the main slide. In this machine tool, the spindle 21 and the feed shaft 30 (which latter operates, through various means, the main slides and the cross slides) are revolved at different speeds which are automatically selected, there being a driving connection between the spindle and feed shaft by which the rate of feed cutting movement of the tool slides is controlled by the spindle speed. Also, the idle movements of the tool slides toward and from the work are driven at a constant high speed; and the rotation of the spindle may be stopped, under certain conditions during such high speed idle movements of the tool slides, so that the workpiece W in the chuck will not revolve in order that tool marks on the work piece will not occur due to unintentional or accidental contact of the tools with the work during their fast idle motion. Furthermore, the change speed gearing, for varying the rate of rotation of the spindle and of the feed shaft, includes the clutches which are under control of a dog wheel 112, having a relatively slow peripheral motion, which releases free fast moving bodies that bring into action power-operated clutch-shifting mechanism to instantaneously shift the selected clutches. This instantaneous shifting of clutches is also particularly useful where it is desired to increase the speed of the spindle to compensate for reduction in cutting speed of the tools on the work, for instance, as the tool proceeds from the work piece periphery inwardly, thus enabling more rapid production of work by the machine under certain conditions as where facing cuts are now performed simultaneously with other cuts.

With the above brief general description, the detailed description of the improved mechanism employed by the present invention will now proceed.

HEADSTOCK

SPINDLE AND SPINDLE DRIVE

With reference particularly to Figures 1, 2, 3, 4, 4a and 5, the bed 24 of the machine is a casting designed to support and, in some instances, enclose its mechanism, the headstock end 20 thereof being formed to provide a casing for the power-plant motors, transmission mechanism, including the speed change clutches and their selective-control and actuating means, as well as to provide bearings 27 and 28 for the spindle 21 and bearing 29 to the feed shaft 30.

The upper portion of the base 24 provides a table-like member 24a upon which are mounted the turret slide 23 and the cross-slides 25 and 26, the mechanism for operating the said turret slide, which is driven from the feed shaft 30, being disposed above and below the table 24a under the turret slide 23.

The spindle 21 is rotatably mounted in the end walls of the head-stock housing 20 in bearings 27 and 28 (see Fig. 4) and is driven from a constant speed motor shaft 31 actuated from a pulley (not shown) or by an electric motor M supported on an end wall of the headstock casing 20. The drive from the motor shaft 31 is through a gear 32 keyed thereon and meshing with idler gear 33 on shaft 34 which idler gear drives gear 35. These shafts and gears run at constant speed while the machine is in operation. From the driving gear 35, the gearing to the spindle 21 includes four automatic speed changes, one pair of hand-change gears and shiftable gearing for converting the machine into a low or high speed machine, all of which being shown in extended arrangement in Figure 4 and the gearing for operating the feet shaft, turret-slide, ball-box mechanism, etc., being shown in Figure 4a, while the entire gearing in Figures 4 and 4a is shown in its assembled arrangement in Figure 3.

With particular reference to Figures 3 and 4 it will be seen that there are two aligned rotatable shafts 36 and 37 mounted in suitable bearings in the headstock frame and that the driving gear 35 is keyed to one end of the shaft 36 which may be regarded as the speed input shaft and that the shaft 37 may be regarded as the speed output shaft. Journaled in the headstock 20 in cooperative relation and parallel with the aligned shafts 36 and 37 is a rotatable counter-shaft 38 which has rotatably mounted upon it four clutches 39, 40, 41 and 42 arranged in two opposing pairs, each pair being served by a single sliding part or cone, respectively—for instance, clutch heads 39 and 40 being served by the clutch cone 43 and clutch heads 41 and 42 being served by the clutch cone 44—thus, when the clutch cones 43 and 44 are engaged with any one of their clutch heads, the other clutch head of each pair is disengaged. The clutches may be of any suitable type although, in the present showing, disc-clutches are illustrated. The sliding parts or cones 43 and 44 are splined on the shaft 38 and are shifted by suitable yokes, as can be seen more particularly from Figure 4. The clutch heads 39, 40, 41 and 42 have fast therewith gears 45, 46, 47, and 48, respectively, of different sizes to effect the automatic change speeds desired. The gears 45 and 46 of clutch heads 39 and 40 mesh, respectively, with their mating gears 49 and 50 fast on the speed input shaft 36 while the gears 47 and 48 of clutch heads 41 and 42 mesh with their mating gears 51 and 52 fast on the speed output shaft 37. With this arrangement, to obtain the four automatic change speeds, the operation of the clutches is as follows:

1. To obtain the lowest speed of spindle operation, clutch cone 43 engages clutch head 40 and clutch cone 44 engages clutch head 42. With the parts in this position the drive from gear 35 is through shaft 36, gears 50 and 46 to shaft 38 which rotates gear 48 meshing with gear 52 fast on speed output shaft 37;

2. In order to obtain the second speed of spindle operation, clutch cone 43 remains engaged with clutch head 40 but cone 44 disengages clutch head 42 and engages clutch head 41, the drive then being from speed input shaft 36 through gears 50, 46, shaft 38, gear 47, gear 51 to speed output shaft 37;

3. To secure the third speed of spindle operation, clutch cone 43 engages clutch head 39 (thereby disengaging clutch head 40) and clutch cone 44 engages clutch head 42, if not already in engagement therewith, whereby the drive is from input speed shaft 36 through gears 49, 45, shaft 38, gears 48 and 52 to speed output shaft 37; and 4. To obtain the fourth and highest speed of spindle operation, the clutch cone 43 engages in clutch head 39, if not already in engagement therewith, and the clutch cone 44 is moved in engagement with the clutch head 41, whereby the drive is from speed input shaft 36, gears 49 and 45, counter-shaft 38, gears 47, 51 to speed output shaft 37.

From the above it will be observed that, during these four automatic speed changes, one of each pair of clutch heads with their mating gears are always engaged while the other two clutch heads with their mating gears are run idle on the countershaft 38 and that any combination of two clutches may be engaged simultaneously within the limitation, of course, that when one clutch of a pair is engaged the other clutch of the same pair is disengaged which is a feature of safety as will appear later from the description under the heading "Operation of spindle speed control."

The spindle drive continues from the speed output shaft 37 through hand-change gears 53 and 54 to shaft 55. These hand-changed gears are respectively fast on the outer ends of the shafts 37 and 55 so as to be accessible for quick manual change through a suitable door in the end wall of the headstock casing 20 and may be provided in groups to obtain different ranges of speeds in a manner and for a purpose well known in the art.

From shaft 55 the machine may be converted from a low speed to a high speed machine, and conversely, but always influenced by the speed changes which are effected by the hand-change gears 53 and 54 and through the automatic clutches just described. By providing shaft 55 with multiple splines 56 on which a double gear 57 and 57a slides and by moving the double gear 57 and 57a manually so that either the low speed gear 57 will mesh with its mating gear 58 or the high speed gear 57a will mesh with its mating gear 59, such change-over may be effected. It will be observed that gears 58 and 59 are keyed to a jack-shaft 60 and that gear 59 is in mesh with a gear 61 keyed to a sleeve bearing 62 in which the rear end of the spindle 21 is splined at 63 for longitudinal adjustment therein. The sleeve bearing 62, as is the shaft 55 and the jack shaft 60, is journaled at 28 in the headstock casing 20 in suitable ball bearings.

The front or chuck end of the spindle 21 is journaled in a ball bearing 27 within a bearing sleeve 64, which latter is slidably mounted for longitudinal movement in the headstock housing 20 (see Fig. 4) in order to provide for adjustment of the spindle 21 longitudinally to or from a slide 23 or a turret face on said slide. This adjustment may be accomplished by the provision of a pinion 65 journaled on the headstock and engaging a rack 66 on the spindle sleeve 64, the pinion being operated through a shaft 67 having a squared end extending through the headstock casing 20 (see Fig. 1). The spindle may be held in adjustable positions by the binding bolt 67a connecting opposed lugs 67b of a split portion of the housing 20.

FEED SHAFT DRIVE

The drive for the feed shaft 30 (which actuates the turret slide 23 and cross slides 25 and 26) is connected directly with the spindle 21 so that the feed will always be in ratio per revolution of the spindle regardless of the speed of the spindle. This feed drive is taken off of the spindle sleeve 62 (Figs. 3 and 4), which has teeth 68 cut therein meshing with a gear 69. The gear 69 is keyed to a jack shaft 70 which has a spur gear 69a fast thereto for driving gear 71 keyed to one end of a stub shaft 72 which also has gear 73 fast thereon to drive gear 75 (Fig. 4a) through the intermediate gear 74. The gear 75 is keyed to an input speed shaft 76 which is aligned with and rotatably independent of an output speed shaft 77 for imparting the requisite feed movements to the turret-slide 23 and the cross-slides 25 and 26.

From this input shaft 76, various feed changes may be obtained through the medium of hand-change gears for the tool slides as well as three automatic feed changes of any selected feed obtained by the hand-change gears. As shown in Figures 3 and 4a, three separate and independent counter shafts 78, 79 and 80 are grouped about the aligned input and output shafts 76 and 77 and suitably journaled in a housing 20. These counter shafts 78, 79 and 80 have rotatably mounted thereon clutch heads 81, 83 and 85, respectively, each clutch head having a mating gear 82, 84 and 86 fast thereon, respectively, which gears are of different sizes, and mesh, respectively, with a cluster gear fast to a main feed clutch head 87 rotatably mounted on the output speed shaft 77. The cluster gear comprises three gear members 88, 89 and 90 which are in constant mesh with gears 82, 84 and 86, respectively. Also, each of said counter shafts 78, 79 and 80 has a sliding clutch part or cone 91, 92 and 93, respectively, splined thereon for reciprocating into and out of engagement with the clutch heads on said counter shafts.

The output shaft 77 has a quick return clutch head 94 rotatably mounted thereon and carrying with it a mating gear 95. The clutch head 94 is in opposed cooperative relation with the main feed clutch head 87 so as to be served by the clutch slide or cone 96 splined on the shaft 77, whereby one of the clutch heads 87 or 94 will be engaged when the other is disengaged or both disengaged when the cone is in a neutral position. The quick return clutch head 94 is for connecting the shaft 77 with the motor 100 for effecting quick idle motions of the tool slides 23, 25 and 26 and, to this end, its mating gear 95 is driven from a pinion 97 fast on the motor shaft 98 through an intermediate gear 99.

The counter-shafts 78, 79 and 80 are driven from the input shaft 76 through hand-change gears (101–102, 103–104, and 105–106, respectively) splined on the ends of said shafts so that they can be readily removed manually through a suitable opening in the casing 20 to effect various ratio combinations of speeds between the input shafts 76 and said counter-shafts in a manner well known in the art. With the selection of hand-change gears shown, the fine or first feed counter-shaft 78 of the feeding mechanism is driven by gears 101 and 102; the second or intermediate feed counter-shaft 79 is driven by gears 103 and 104; and the third or coarse feed counter-shaft 80 is driven by gears 105 and 106, all, as above stated, are hand-change gears well known in the art.

The three automatic changes of speed of feed of the tool slides are obtained in the following manner:

1. For fine feed movement of the tool slides, all of the clutch cones 91, 92 and 93 being out of engagement with their respective clutch heads, the clutch cone 91 is moved into clutching engagement with the clutch head 81 and cone 96 is moved into engagement with main feed clutch head 87, thus the drive being from input shaft 76 through hand-change gears 101, 102, shaft 78, clutch head 81, gears 82, 88, and main feed clutch head 87 to output shaft 77. It may be noted here that the clutch cone 96 is in engagement with the main feed clutch head 7 during all feeding operations and is only moved out of engagement therewith when it is desired to effect the quick idle movements of the tool slides or when the feed mechanism is hand operated for "setting-up" or the machine stopped;

2. For the second or intermediate feed of the tool slides, and cones 91 and 93 being disengaged from their respective clutch heads, the cone 92 is moved in engagement with clutch head 83, thus the drive being from input speed shaft 76, through hand-change gears 103, 104, shaft 79, clutch head 83, gears 84, 89, and main feed clutch head 87 to output shaft 77; and 3. For the third or coarse feed of tool slides and with the clutch cones 91 and 92 disengaged from their respective clutch heads, clutch cone 93 is moved into engagement with clutch head 85, thus the drive being from speed input shaft 76 through hand-change gears 105, 106, shaft 80, clutch head 85, gears 86, 90, and main feed clutch head 87 to output shaft 77.

As will be seen hereinafter, the mechanism which operates the clutch cones 91, 92, and 93 is to be interlocked so that, when any one of the three clutch cones is operated to engage its clutch head, they automatically disengage any other of said clutch cones that was previously in engagement, this being a safety feature which permits only one of the three feed clutches to be engaged at one time while the other clutch heads and their mating gears run idle on their respective shafts. Also, the counter-shafts 78, 79 and 80 are rotated continuously from the input shaft 76 through their respective hand-change gears while the machine is in operation.

The fast motion of the tool slides 23, 24 and 25 (that is, their idle motion from the time that any tool then in operation has finished cutting and is brought back to clear the subject being machined, the turret indexed, and then moved forward to bring the next set of tools to the subject) is obtained by means of the quick return motor 100, which runs at constant speed continually during operation of the machine, through pinion 97 on motor shaft 98 driving gear 99 meshing with mating gear 95 of quick return clutch head 94, which latter is engaged automatically by clutch cone 96, when it disengages the main feed clutch 87 and passes through a neutral position, whereby "fast motion" is imparted to output shaft 77. When the tools of the turret slide 23 and/or the cross slides 25 and 26 are again in position for cutting operations on the work-subject, the quick return clutch 94 is disengaged and the main feed clutch 87 is engaged by the cone 96 whereby shaft 77 is again brought to feeding motion. When "fast motion" is in operation, cluster gear 88—89—90 runs idle on shaft 77 and shaft 76 runs idle in the end of shaft 77, as shown at point 76a.

From output shaft 77, "feed" or "fast motion" is transmitted to the feed shaft 30 (which operates turret slide 25 and cross slides 25 and 26) through gear 107 loose on shaft 77 but made fast thereto by means of a safety coupling which comprises, in the present instance, a shear pin 108 held in an annular flange 109 on one face of gear 107, and extending into a disc member 110 disposed within the bushing 109 and keyed to shaft 77. Gear 107 drives gear 111 keyed on feed shaft 30. If load exceeds normal operating conditions shear pin 108 breaks thereby protecting the mechanisms of the machine. After cause for abnormal load is removed, a new shear pin 108 is inserted and machine is again read for operation.

A speed and feed control device 112 (Figs. 1, 3, 15, 16 and 17), which automatically controls the operations of all the clutches and therefore the operation of the tool slides in particular, is also driven from gear 107 (Fig. 4a) by bevel gear 113 having an adjustable drive connector, as at 114, with the gear 107, the connector 114 being interengaging teeth or projections on opposing faces of gears 107 and 113 and held in adjusted fixed engagement by the nut 115 and shoulder 116 on shaft 77. This control device 112 is driven by bevel gear 113, fast on shaft 77 and meshing with beveled gear 117 keyed on worm shaft 118 and through worm 119 also keyed on shaft 118 drives worm gear 120 keyed on shaft 121 and drives the central device 112 (see Fig. 4a), to which dogs are adjustably fastened that control the automatic operation of the clutches of the machine. It will thus be seen that, by having the gear 107 rotatable on the shaft 77 and coupled thereto by the shear pin 108, the timing between the control device 112 and the feed shaft 30 (and thus the turret slide 23 and the cross slides 25 and 26) will not be altered should any overload, jamming or other incident occur which would cause the shear pin 108 to break.

As shown in Figures 1, 3 and 4a, the worm shaft 118 is provided on its outer extremity with a square end 118a to receive a hand-crank, or other instrument, for hand-cranking the machine for "setting-up" purposes as is well understood in the art.

In this connection a safety device 122 (see Fig. 15) is provided whereby the machine cannot be cranked by hand until clutch cone 96 is manually thrown to neutral position so as to disengage shaft 77 from both the main feed clutch 87 and the quick return clutch 94 (see Fig. 4a) in order that power to the shaft 77 will be disconnected therefrom during the hand-cranking of the machine. Likewise, while the hand-crank is on the shaft end 118a, clutch cone 96 cannot be thrown into engagement with either clutch 87 or 94. When the crank is removed from the shaft end 118a, the clutch cone 96 can again be operated. While the control device 112 is, of course, operated in timed relation to the position or movements of the tool slides 23, 25, and 26 for reasons that can be well understood, the power transmission device (or ball-box), which is controlled by said control device, actuates the clutch cones automatically and is driven from the constant speed quick return motor 100 through a pinion 123 keyed on the motor shaft 98 and meshing with gear 124 keyed on the stud shaft 125 which is geared to the ball-box drive shaft 126 through pinion 127 and gear 128. Thus, the ball-box shaft 126 is driven at a constant high speed at all times the machine is in operation. Also, stud-shaft 125 is coupled, as at 129, to a pump shaft 130 that operates lubricating gear pump 131.

TOOL SLIDES

As above stated, all movements of the main or turret slide 23 and the cross-slides 25 and 26 are actuated from the feed shaft 30 through a single disc-cam 135, which also indexes the turret, if one is employed on the main slide, and actuates a cross-slide pre-selective device S that renders effective and ineffective the connection 205, 230 and 253 for actuating the cross-slide from the movement of the main slide.

Main or turret slide

The main slide 23 is a flat box-like casting, as can be seen from Figures 1, 2, 5 and 6, providing a substantially flat top a, side and end walls b, with the bottom wall c slotted longitudinally of its movement, as at c', with the marginal edge portions of said slot c' being formed into inverted channels d and d' to fit over and receive bearing rails 136 and 137, commonly called the "ways," disposed in parallel relation longitudinally of and on opposite sides of the bed-table 24a and parallel with the axis of the spindle 21. At least one of said channels, as shown at d, has opposing sidewalls which lie, respectively, on opposite sides of its rail 136. The ways 136 and 137 may be fastened to or be part of the bed of the machine, but in the present case are shown as separate hardened steel rails fastened to the bed table 24a of the machine bed by bolts 138, Fig. 12. The slide 23 has its inverted channels d and d' provided with inserts 139 of hardened steel in the walls thereof, as shown particularly in Fig. 12. However, interposed between and cooperating with a complemental surface of the channel d of the slide 23 and the outer side of rail 136 is a suitable gib 140, of conventional construction, for taking up any lateral wear or play occurring between the slide and the ways (see Figs. 6 and 12). Means are also provided compensating for vertical wear—i. e., wear on the top surface of the ways or guides d and d'—and, to this end, is employed clamping straps 141 and 142 (see Figs. 5, 6 and 12), one for each of the ways 136 and 137, respectively, and arranged to underlie the bottom wall c of the slide 23 and the adjacent side edges of the table 24a of the machine bed 24. These straps have their longitudinal upper edges bevelled, as at e, to engage complemental overhanging chamfered surfaces on the sides of the bed table 24a and on the slide 23, respectively.

These straps serve to keep the slide in firm contact with the bed table, as is obvious, by means of bolts 143 arranged at spaced intervals along the channel d and d' of the slide 23 and extending through openings therein and threaded into openings provided in the straps 141 and 142 (see Figs. 5 and 12). These bolts 143 are each surrounded by a sleeve 144 having an enlarged head threaded, as at 145, into recesses in the upper face of said channel portions d and d' of the slide 23 and the heads of the sleeves are correspondingly formed with a recess 146 to rotatably receive the heads of the bolts 143. The shank of the bolts 143 should be of less diameter than the passage through the shank of the sleeves 144 to allow a clearance for a slight shifting movement of the bolts during their adjustment. Thus, to compensate for vertical wear, bolts 143 are loosened and the heads of the sleeves 144 are threadedly adjusted in the slide 23 the required amount; the bolts 143 are then retightened.

Turret

Tools or work holders (the latter where the spindle chuck 22 carries boring or reaming tools) may be attached directly to the main slide 23 when a turret is not desired in this particular machine, but since this machine contemplates the employment of an improved turret and turret indexing mechanism, the same is shown and described as part of the present invention.

As is common in most all turret lathes, the turret 165 is rotatably mounted about a vertical axis upon the top surface a of the main slide 23 at its forward end—i. e., nearer the spindle 21 and in substantial axial alignment with the chuck 22 on the spindle 21. The turret 165 has a polygonal perimeter about its rotary axis to provide a predetermined number of substantially vertical faces having sockets and thread openings 166 and 167, respectively, for the attachment of tool or other holders, not shown. One or more tools, carried by each face, perform cutting operations at or about the same time upon the subject, to be machined, clamped in the chuck 22 on the rotating spindle 21 during part of the forward movement of the slide 23. There is one forward movement of the slide 23 for each face of the turret 165 in order to complete the cycle of the machine. The number of faces on the turret may vary according to the type of work to be performed by or the intended capacity of any particular machine. In the present showing, the turret 165 is shown as having six faces.

In order to provide for desired clearance, the top surface a of the turret-slide 23 is formed with a depressed offset forward end portion f and from the center of which rises an annular base g upon which the turret 165 is rotatably mounted (see Figs. 1 and 5). (If a turret is not employed, a cover, not shown, may be clamped to said base g to support other attachments.)

As seen particularly in Figs. 7 to 8a, the top edge of the annular base g is provided by a reduced upstanding annular seat 168 flat on its upper surface, upon which latter is seated the flat surface of a complemental under-cut circular shoulder 169 near the bottom of the turret 165.

The under-cut shoulder 169 of the turret forms on the bottom face of the latter a reduced hub 172 having a cylindrical surface 172a, the lower or outer edge of which is outwardly flared to form the chamfered surface 173 of considerable less diameter than the inner circumference of the annular base g.

In order to center the turret, which is slightly shiftable laterally, on its annular base support g, a semi-circular inwardly projecting rib or boss 170 is disposed on the inner circumferential surface of the base g, near the seat 168 thereof, and extends (about 180°) around the side half of the base g nearest the spindle 21, the inner lower edge of said centering boss 170 being chamfered to provide an upwardly and outwardly inclined surface 171. The centering boss or rib 170 may be, and preferably is, interrupted or cut-away, as at 170b to provide a relief at a point opposite the spindle 21. The inner surface 170a of the base 170 and its inclined surface 171 are complemental to the cylindrical surface 172a of the hub 172 and its flared end surface 173, respectively, so as to contact and cooperate therewith for firmly centering the turret when the latter is locked in position by the wedge 175. As above stated, the dimensions of the hub 172 and its flared end portion 173 are less than the inner circumference of the annular turret supporting base g including the inner surface of the boss 170, so that the turret can be lifted out of position when the locking means 175 (later to be described) is removed from locking position.

The outer peripheral edge of the shoulder or bearing surface 169 of the turret has a downwardly extending lip i which overhangs the bearing surface 168 so as to exclude chips and dust from between said surfaces. The surface of the seat 168 opposing the lip i is cut-away, as at h, to provide clearance therebetween so as to allow the aforesaid slight lateral shifting movement of the turret.

Applied to the under surface of the turret and of a diameter no greater than the flared end 173 of the hub 172, is an index and lock disc-plate 174 in the form of an annulus secured to the hub by bolts 174a and is concentrically arranged on the hub of the turret by means of a centering boss 177 on said hub. This member 174 cooperates with an indexing element 180 on the disc cam 135 for indexing the turret and with a wedge lock 175 for locking the turret in indexed positions. To this end, the under surface of the disc-plate 174 is provided with a plurality of grooves 176, one for each face of the turret and arranged in a somewhat radial manner, as particularly shown in Figures 7 and 8, with their outer ends open at the edge of the disc and positioned, preferably at points corresponding to the corners of the faces of the turret. These grooves 176 are actually arranged as in a chordal or radially offset manner, rather than being truly radial, in order to obtain easy leverage for revolving the turret when the indexing pin 180 on cam-disc 135 enters therein. The upper surface of the disc-plate 174 is reduced in diameter to provide a circular shoulder 178 with the perimetal surface of the reduced portion formed polygonally, as at 179, to correspond with the number of and the position of the turret faces, these polygonal surfaces 179 being upwardly and inwardly inclined to be engaged by a corresponding surface on the wedge-lock 175.

Turret slide cam, turret indexing and locking means

The main or turret slide 23 is reciprocated on its ways 136 and 137, above described, to and fro with respect to the chuck 22 on the end of the spindle 21, by means of the horizontally disposed disc-cam 135 positioned within the slide 23 between its top surface a and its bottom wall c (see Figs. 5 and 6), and therefore above the ways 136 and 137. This disc-cam 135 is provided on its top surface with a substantially heart-shaped box-cam groove 135a into which extends a cam roll or follower 147 (Figs. 7 and 8) carried on the under face of the top side a of the slide 23 and is disposed off center with respect to the longitudinal center line through the slide to reduce side pressure on the ways 136 and 137 for smooth operation of the slide, the cam rotating in the direction of the arrow shown in Figure 5.

As particularly shown in Figure 6, the disc-cam 135 is driven from a worm 148 on the feed shaft 30 mounted in bearing 29 (Fig. 4a), at its forward end which extends into the head-stock casing 20, and mounted in bearings 149 and 150 (Fig. 5) disposed on opposite sides of the worm 148 and supported by the machine bed frame 24. The worm 148 drives horizontally disposed worm wheel 151 on the same axis with the disc-cam 135 and operatively connected with said axis to rotate said cam. The mounting for the disc-cam 135 and the worm 151 may be of any suitable construction. However, as is here shown, the worm wheel 151 has a depending hub 151a supported in a thrust bearing 152 on the bed 24 of the machine and is keyed to the lower vertically stepped end of shaft 153 extending through said hub and which has a headed upper end fast to the disc cam 135; a sleeve 154 surrounds the shaft 153 between the cam 135 and the worm wheel 151 and is connected to concentric positioning bosses 155 and 156 thereon, respectively, the upper end of the sleeve extending through an opening 154a in bed table 24a and being journalled in a vertically disposed roller bearing 157 positioned in the opening 154a whereby a very sturdy and economical assembly is provided for supporting and driving the cam which can be readily assembled and disassembled. By removal of the nut 158 on the lower end of the shaft 153 extending through the thrust bearing 152, the disc-cam 135 and its shaft may be removed for repair or for replacement, when the top wall or plate a' of the slide 23 and the follower 147 is removed and the slide 23 moved on its ways as shown in Fig. 5.

The roller follower 147 (Fig. 7) is preferably mounted in a roller bearing 159 whose bushing 160 is held against rotatable movement by a pin or screw 160a. By removing the screw 161, the retaining cap plate 162 may be removed—thus allowing bushing 160 and the roller follower 147 to be removed as a unit from its socket in a guide block 163 removably secured to the turret slide 23 by bolts 164 (Figs. 5 and 8) or formed as an integral part thereof, under its top surface a and behind the turret 165.

One revolution of the worm wheel 151, driven from the feed shaft 30, effects a corresponding revolution of the cam-disc 135 which causes one full reciprocating motion of the main slide 23 from its starting point toward the chuck and back to its starting point through the mechanism above described. In Figure 5, the parts are indicated as they approach the finish of the backward movement of the slide while, in Figures 7 and 8, the parts are shown at their starting point with the indexing of the turret about to take place. Before the indexing takes place, the turret wedge-lock 175 is withdrawn, as shown particularly in Figure 8.

This wedge-lock is supported in a horizontally slotted or bifurcated front face of the guide block 163, as at 181 (Fig. 8), with the bottom wall or crotch of the slot oblique, as indicated in the drawings, to provide a wedge slot so that, as the wedge plate 175 slides in such slot longitudinally thereof and transversely of the machine and under the action of a biasing spring 190 (Fig. 5) to locking position, its straight chamfered forward edge will bear against complemental chamfered surface 179 on the disc-plate 174 (Fig. 7), the opposite edge of the wedge plate being formed complemental to the bottom wall of the wedge slot 181.

Therefore, to withdraw the wedge-lock 175, the cam-disc 135 has secured to its upper surface a plate-cam 182 positioned so that, when the cam disc 135 is in the position shown in Figure 8, the dwell portion 182a of said plate-cam contacts roller 183 and, riding upon it, moves lever 184 to withdraw the wedge lock 175 against tension of the spring 190 to the position shown in Figure 8 thereby releasing the turret 165 for indexing. The lever 184 has one end fulcrumed at 185 to a rear portion of the turret slide 23, Fig. 5, while the roller 183 is disposed intermediate the length of the lever 184 and is journalled on pin shaft 186 and the other end of the lever is formed with a radius end 187 extending into a correspondingly formed slot 188 at one end of the wedge-lock 175 to prevent the latter from getting out of position when being moved, as will be presently explained, by the corners of the polygonal surfaces 179 on the disc-plate 174 (see Figs. 8 and 8a).

At this point, the cam-disc 135 has moved the turret indexing pin 180 carried on the disc 135 to enter the outer end of one of the grooves 176 in the disc-plate 174 (as at x, Figure 8) which groove has been brought to position to receive the indexing pin by a previous indexing of the turret, after the manner of a Geneva movement. Having entered the groove and continuing in its movement with cam-disc 135, the pin 180 indexes the turret 165 one position—i. e., moves the turret face opposite the chuck 22 (one-sixth of a revolution of the turret)—and, thus, brings the next succeeding turret face opposite the chuck 22, at which time the pin 180 leaves the groove at the point y (Fig. 8).

During this indexing of turret 165, the wedge lock plate 175 is in the position shown in Figure 8, but, as the turret commenced to turn on its axis, the corner z on the disc-plate 174 (which is then at the point x) engages the wedge-lock 175 causing it to fulcrum on radius 187 at the end of lever 184 and swing into a pocket 189 formed in the bottom wall of the guide block 163, thereby allowing the corner z to pass; otherwise, the wedge-lock would have to be withdrawn a greater distance requiring greater movement of operation parts, more clearance, etc., said swinging movement being permitted by cut-out 189a in wedge 175.

After the indexing pin has substantially completed the indexing of the turret or at least after the corner z has completed more than half of its movement, the dwell 182a on the plate cam 182 releases the arm 184 to allow the biasing spring 190 to act upon the wedge lock 175 and move to its locking position, as shown in Figure 5. Angular surfaces 191 and 192 on the guide block 163 and angular surface 193 on the wedge-lock 175 prevent the latter from jamming in the pocket 189, when the lever 184 is released, and the biasing spring 190 becomes effective for moving the wedge-lock in locking position. When the position of the indexing pin 180 is such as to have brought the turret to its indexed position, the wedge-lock 175 is snapped into position wedging itself between the oblique bottom surface of the slot 181 and the opposing chamfered surfaces 179 on the disc-plate 174 secured to the bottom of the turret, thus forcing the forward surface of the hub 172 and its bevelled end 173 of the turret against the complemental surfaces 170a and 171 of the boss 170 (Fig. 7) thereby locating the turret in position and locking it upon its seat 168. The biasing spring 190 may be either a tension spring or compression spring suitably located on the machine, but for present purposes is shown as consisting of a tension spring secured at one end to the outer wall of the main slide 23 as at 194 (Fig. 5), its other end being connected to a cable 195 which passes over a pulley 196 and secured to the wedge-lock-plate 175 as at 197.

Cross slide

This machine, as are most turret lathes, is equipped with two tool cross-slides 25 and 26 disposed on opposite sides of the chuck 22 and mounted for reciprocatory movement transversely of the axis of the chuck so as to move the tools carried thereby to the work-piece in the chuck to perform certain operations thereupon, and the tools thereafter are returned to a neutral or inoperative position (Figs. 2, 5 and 10).

The reciprocation of the cross-slides transversely of the spindle 21, in this case, however, is derived from the reciprocatory movement of the main or turret slide 23, which is longitudinally of the spindle, through the pushrods 253 and 205 and latches 230 and through a simplified and novel arrangement of sliding, rather than rotary, elements generally indicated at 200 (Figs. 1 and 5) which actuate and control the actuation of the cross-slide positively, accurately and with a maximum of smooth motion and which eliminate a number of required machined and fitted parts and the necessity for complicated timing devices between the main slide and cross-slide—all making for compactness and simplicity in manufacture, assembly, maintenance and manipulation by any operator.

While the cross-slides derive their to and fro motion from the to and fro motion of the turret slide 23 and synchronously therewith, whether one or the other, or both of the cross-slides are brought into operation—so that the tools thereon will perform on the workpiece at or about the time with the tools on any one of the faces of the turret 165 (if tools are on turret face) or independently thereof—they are controlled by a simple manually manipulatable preselector actuated by each revolution of the cam-disc 135. Thus, all the operations of the turret slide 23 and cross-slides 25 and 26 as well as the indexing of the turret 165 being controlled from fixed parts on the cam disc 135, it is impossible for one operation to become out of time with another.

As can be seen from Figures 1, 5, 9 and 10, the cross slides 25 and 26 are mounted on the ends, respectively, of a cross slide base 198 extending transversely across the bed 24 of the machine between the chuck 22 and the turret slide 23. This base rests directly upon the ways 136 and 137 of the bed and is fastened to the latter by bolts 199. The ends 200 of the cross slide base 198 are each constructed box-like to house and guide the cam mechanism which transmits the motion from the turret slide to the cross slides. The top wall 201 of each box-like ends 200 is removably held in place by screws 202 and is formed with a central upstanding rib or boss 203 extending longitudinally of the base 198 and is provided on its top surface with a longitudinally extending dove-tailed slot 204 which forms the ways 204 for its cross-slide 25 or 26, respectively.

The construction and operation of the front cross-slide 25 and of its cam mechanism is identical with and is a duplicate of that of the rear cross-slide 26 and, therefore, only the former will be specifically described. Particularly in Figures 5 and 9, it will be seen that a push rod 205 is connected with the forward end of the turret slide 23, this push-rod being in two axially aligned sections s and t slidably connected by a square-lock l (see Figs. 9 and 9a), the section t slidably extending into a cylindrical bore 206 in the turret slide 23 at one side thereof and the section s slidably extending through and being guided by openings in spaced lugs 207 depending from the bottom face of the end 200 of the cross slide base. While the push rod 205 may be a one-piece construction, it is preferred to construct it as above indicated so that the turret slide 23 may be quickly removed without disturbing the cross-slides, or vice versa. Mounted on the push rod 205 between the lugs 207 is a collar 208 rigidly fastened to the said rod by pin 209, which extends vertically through the collar and through the rod, and has journalled on its upper end a cam path follower-roller 210. The collar 208 has an extension on its lower side either bored or bifurcated, as at 211, to receive or straddle a guide rod 212 extending parallel with the push rod 205 and fastened at its ends in the lugs 207, respectively. Disposed within the box casing 200 is a multiple rectilinear wedge-cam unit which transmits motion from the push rod 205 to the cross slide 25 so as to reciprocate the latter back and forth synchronously with the back and forth movement of the turret slide 23 but at right angles to the latter.

This cam unit comprises an elongated sliding plate 213 disposed in the box casing 200 (Figs. 5, 9, 10 and 11) and is held in position by the top, bottom and side walls of said casing to be slidably guided thereby, the side walls 214 forming a cam path to guide the plate 213 obliquely with respect to the movement of the rod 205 and the cross slide 25. In order to provide for a maximum of smooth operation of the cross-slide 25 in its way 204, it has been found that this oblique movement of the slide plate 213 should be at about 22½ degrees, a little more or less, with respect to the movement of the push rod 205. Formed on the under surface of the slide plate 213 is a cam path 215 receiving the cam roller 210 on the push rod 205. This cam path 215 extends substantially at right angles to the rod 205 and may be, as shown in the drawings (Figs. 9, 10 and 11) provided, for convenience, in a separate piece 216 fastened to the under side of the slide plate 213 by screws 217 and interengaging rib 216a and slot 213a (Fig. 11). It is, of course, understood that the bottom wall of the box casing 200 is opened to allow the cam roller 210 and the plate 216 to extend therethrough and is sufficiently enlarged to allow for the required movement of these parts.

The upper face of the slide plate 213 carries a cam follower-roller 218 journalled on a pin 219 position about midway the length of the sliding plate 213. The cam roller 218 is disposed in a cam path 220 on the bottom face of the cross slide or, as shown in the drawing, in a plate 221 secured by bolts 222 to the underface of the cross-slide 25 and having a centering rib 223 on its upper face extending longitudinally of the cross-slide way 204 and projecting through an elongated slot 224 in the top wall 201 of the box casing 200 in which it slides longitudinally of the way 204. The cam path 220 extends obliquely to the direction of movement of the push rod 205 and in a direction opposite to the cam path 215 of the slide plate 213, but is also at an angle of about 22½ degrees with respect to the movement of the cross slide. With this multiple rectilinear wedge cam unit, designed as above described and having the angles of the cam paths as defined, the rate of travel of the cross-slide 25 is the same as that of the turret slide 23 from which it derives its movement.

Mounted in ways 225 on the surface of the cross-slides 25 and in ways 226 on the cross-slide 26 are manually adjustable tool supports 25a and 26a, respectively, as shown in Figure 1, upon which are fastened brackets or holders 25b and 26b respectively, in which the tools may be mounted.

As will be obvious from the above, to and fro movement of the turret slide 23 imparts like to and fro movement to the cross-slides 25 and 26 and at the same speed as the former but for a less distance, which is controlled by a latch member 230 operating in a notch 229 in the push rod 205 (Figs. 5, 9 and 9a). Also this latch 230 is controlled by a selective mechanism S (Fig. 5) which has been previously manually adjusted to bring into operation or to release from operation either one of the cross slides upon each forward movement of the turret slide.

*Cross slide control*

The cross-slide control or selective device S is located, for convenience, on the rear end portion of the turret slide 23, as particularly shown in Figures 1, 5 and 6, and is supported from the under face of that portion of the top wall $a$ of the turret slide which forms a removable cover plate $a'$, so that it may be actuated from the cam disc 135 when the turret slide is in its back or starting position and at or about the time the turret 165 is indexed.

This selective device S comprises a short vertical shaft 231 (Figs. 6 and 6a) rotatably mounted, at a point along the longitudinal center-line of the turret slide 23, in a bushing 232 carried by web arms 233 which are part of the structure of the turret slide top wall cover plate $a'$. The lower end of the shaft 231 is headed, as at 234, and has keyed to it, between said head and the lower end of the bushing 232, a rotatable wheel or disc 235 and also has keyed to its upper end, above the bushing 232, a positioning disc 236 which is held in place by a washer 237 and a screw 238 extending into the end of the shaft 231; thereby supporting the shaft in position. The under surface of the rotatable wheel or disc 235 is provided with a plurality of substantially radial grooves 239 equal in number to the faces on the turret 165 and, therefore, equal in number to the grooves 176 in the turret disc-plate 174 so that rotatable disc 235 will be moved about its axis 231 corresponding with the movement of each face on the turret.

The rotatable disc 235 is so positioned that, when the turret slide is in its back or starting position, one of the grooves 239 thereof will be in a position indicated at $x'$, Fig. 5, to receive a pin 240 on the outer edge portion of the cam-disc 135 and—after the manner of a Geneva movement—will index the disc 235 one sixth of a revolution (there being six faces on the turret) and, then, will leave its groove at the point $y'$ (Fig. 5) and having brought the next succeeding groove 239 into the position $x'$ to be entered by the pin 240 upon the next revolution of the cam-disc 135. The rotatable disc 235 is maintained in its correct indexed position by means of a yieldable abutment 242 having frictional contact with the periphery of the positioning disc 236 which has lobes 241 extending radially from its periphery at equally spaced intervals, as shown in Fig. 5. Abutment 242 is shown as a spring pressed detent mounted in a bracket carried on underface of the removable cover 243 on the turret slide cover plate $a'$. Thus, the detent 242 creates a frictional drag on the positioning disc 236 which, when the indexing pin 240 leaves a groove 239 in the disc 235, plus the added resistance offered by one of the lobes 241, will hold the cross-slide selector assembly, just described, in its indexed position. It will be noted that the lobes 241 are positioned to oppose the detent 242 at the end of the index movement and have convexed surfaces which will permit the detent to ride over them under the pressure of positive operation by the cam disc 135. The cover 243 permits access and removal of a cross-slide selector unit for repair or for setting up purposes of the machine.

The rotatable disc 235 has a plurality of radially disposed recesses 244 in the circumferential face thereof corresponding in number to the indexing grooves 239 and, preferably, disposed immediately above these grooves as shown more particularly in Figs. 5, 6 and 6a. These recesses 244 are to have dogs 245 removably inserted in them when a particular operation on the workpiece W does not require the operation on the workpiece W of the tools on either the front or rear cross slide 25 and 26, or both, in connection with any one of the forward movements of the turret slide.

Therefore, it will be understood that, when either or both of the cross slides 25 and 26 are to be moved toward the chuck 22 by any forward movement of turret slide 23 or to cooperate with any face of the turret slide for a cutting operation, no dog 245 will be required in the recesses 244 of the disc 135 controlling that operation of the cross slide to be so operated. To this end there are provided two rods 25c and 26c, disposed in substantially axial alignment and radially disposed on opposite sides of the disc 135 and extending transversely of the turret slide 23, rod 25c for controlling the operation of cross slide 25 and rod 26c for controlling the operation of cross slide 26.

These rods 25c and 26c are slidably mounted in suitable bearings 246 in the turret slide 23 and each has its inner end yieldably pressed against the disc 235 at diametrical opposite sides on its circumference by compression springs 247 disposed at their outer ends and held in place by removable plug-nuts 248 in the side walls of the turret slide. The recesses 244 are so arranged in the disc 235 that after each indexing movement of said disc, two of said recesses—i. e., on opposite sides of said disc—are brought opposite the inner ends of said rods 25c and 26c, where the disc becomes arrested until the next indexing movement (Figs. 5 and 6). This position of the recesses 244 opposite the inner ends of rod 25c and 26c is the control station for the cross-slides 25 and 26.

The inner end of each of the rods 25c and 26c is formed or cut to provide an axially offset projection $m$ within the circumferential confines of the rod, the projection $n$ of the rod 25c being offset oppositely to or disaligned axially with respect to the projection n of rod 26c, as particularly shown in Fig. 6.

Each of the rods 25c and 26c operate its respective latch member 230 (Figs. 5, 6, 6a, 9, 9a and 9b) through an L-link 249 having a hooked connection, as at 250, with a projection ear 251 on a collar 252 fast on the rear end of an oscillating latch shaft 253 which has fast on its forward end the latch member 230.

It will thus be manifest, when there are no cross-slide dogs 245 at the two control stations on the disc 235, after an indexing movement of said disc, that no shifting of rods 25c or 26c will take place and that the springs 247 will hold the surface p of the latches 230 in contact with the flattened surface q on their respective push rods 205, which thus limits for the time being the inward movements of the rods 25c and 26c.

Now, with parts in the position just described, as the turret slide 23 is moved forward by the cam disc 135 (after turret has been indexed and locked in position as above described) the latches 230 moving with the turret slide along the surfaces q (Fig. 9a) of the rods 205 until they reach the notches 229 where they are forced into their respective notches by the springs 247, described above; and, because of the sharp abutting shoulder r, the relative movement between the latches 230 and their push-rods 205 is arrested, thus coupling the rods 205 with the turret slide 23 and moving the rods forward. This forward movement of the rods 205 effects, through the multiple rectilinear wedge-cam units in their respective housings 200, a forward movement of the cross-slides 25 and 26 toward the workpiece W in the chuck 22.

When the turret slide 23 starts its backward movement, the latches 230, retaining their engagement in the notches 229 under the pressure of the springs 247, will draw their respective push rods 205 backwardly at the same time and at the same rate of speed as the turret slide 23 until the cross slides are brought up against a positive stop (not shown), thus finishing their travel, which causes the bevelled edges p' to ride up over the bevelled surfaces r' of the notches 229 onto the surfaces q of the push rods 205, where the surfaces p of the latches 230 slide for the rest of the return movement of the turret slide 23. If for any reason the latches 230 are forced up onto the surfaces q before the cross slides have completed their back travel, the latch members 230 will strike the upstanding square abutment 254 on the outer extremity of the section t of the push rods 205 and return the cross slides to their back position on the last portion of the turret slides back travel. In order to prevent the inner ends of the rods 25c and 26c from entering the recesses 244, when no dogs 245 are employed therein, the latches 230 may be adjusted on their oscillating shafts 253 by set screws 255 (Figs. 6, 9 and 9b), to avoid this contingency.

The dogs 245 are in effect plugs inserted into the recesses 244, and either frictionally held in place or positively by pins 256, so that their outer ends will project beyond the periphery of the disc 235. The projecting ends of these dogs, however, are cut away so as to provide an axially offset projection m (see Figs. 6 and 6a within the perimetal of the plugs and are complemental to the projections n on the rods 25c and 26c. Thus, it will be seen that the dogs 245 placed in the position shown in Figure 6, at the two stations shown therein, the dogs will shift the rods 25c and 26c against the spring 247 to release their latches 230 (i. e., move them beyond the perimetal confines of the rods to pass the shoulder r), so that the cross slides 25 and 26 will not be operated as long as these dogs retain rods 25c and 26c in this shifted position as shown in Figure 6. Because of the construction and arrangement of the inner offset ends n of the rod 25c and 26c and of the ends m of the dogs 245, other dogs 245 may be arranged in their recesses 244 as shown in Figure 6a, where the end of dog, as at 245a when brought in contact with rod 25c, will enter the clearance o of rod 25c thus allowing its spring 247 to maintain said rod in contact with the perimeter of the disc 235 to retain its latch member 230 in contact with the surfaces q on its push rod 205 and actuate the cross slide 25; whereas, when the dog 245a contacts the rod 26c, the projecting end m of said dog will engage the offset end n of said rod 26c and shift the same to release its latch 230, thus causing the cross slide 26 not to be actuated. Also, by placing a dog 245 at a right angle to the position 245a in Fig. 6a, so that the width of its end m extends vertically, as shown at 245b, Fig. 6a, this dog will actuate each of said rods, 25c and 26c, when indexing to them respectively, to cause the cross-slides 25 and 26 not to operate. It will be manifest that by omitting a dog 245 from a recess 244 in disc 225 and by varying the positions of the dogs 245, as above described, various combinations of operations of the cross-slides may be obtained; for instance, cross slide 25 may be operated while the cross slide 26 is not operated, or vice versa; that both the cross slides may or may not be operated simultaneously or that either of the cross slides may be operated to the exclusion of the other during any cycle of the machine.

CONTROL AND ACTUATING MECHANISM FOR SPEED AND FEED CHANGES

The control and actuating mechanism for producing changes of speed or rate of movement, both automatically and manually, of the spindle 22 (called the "speed") and of the turret-slide 23 and the cross-slides 25 and 26 (called the "feed")—other than that produced by hand-change gears—is disposed within the headstock 20 below the spindle 21, as generally indicated at 112 on Figs. 1 and 3 by shafts 121 and 126 in Fig. 3. This mechanism is shown in detail more particularly in Figs. 13, 14, 15, 16, 17, 18, 19, 20 and operates spindle speed clutches 39, 40, 41 and 42 of Fig. 4 and the clutches 81, 83, 85, 89 and 94 of Fig. 4a which control the rate of movement of the turret-slide 23 and cross-slides 25 and 26.

The automatic control device 112 of this mechanism has its shaft 121 driven synchronously with the feed shaft 30 by the gear 107 through bevel gears 113 and 117, shaft 118, worm 119, worm gear 120 fast on shaft 121 (see Figs. 4a and 13) as described above. As shown particularly in Fig. 13, the control device 112 comprises, in part, of a plurality of discs 260 keyed to and separated by spacers 257 on the shaft 121, and clamped rigidly together by means of a nut 121a threaded on one end of the shaft and pressing the assembly against a shoulder at the other end of the shaft, the discs having suitable peripheral slots in which dogs 261 are adjustably clamped.

To perform the functions of the machine tool shown, eleven of said discs 260 are provided; however, more or less of said discs and their associated actuated parts (to be described) may be provided as may be found necessary or desirable to give the requisite speed, feed, fast motion changes, starts and stops for the functions or operations of the machine tool. The reference characters of these discs 260 are accompanied by suffix letter characters (A to J inclusive and F″) to permit an easier understanding and description of their individual identification and function. Also, the reference characters of parts actuated or controlled by the dogs on each of said discs will be accompanied by suffix capital letters corresponding to those of the disc from which said parts are actuated.

As shown in Fig. 13, the shaft 121, with its discs 260—A to 260—J and its spacers 257, is supported at one end on an axially projecting hub portion of the worm gear 120 journalled in a stationary part of the headstock casing 20; and is driven therefrom by a coupling pin 258 extending through a flanged end of the shaft and the worm gear 120. Thus, the worm gear 120 and shaft 121 are connected by a positive drive connection to the turret-slide and cross-slide drive so that the discs 260—A to 260—J and 260—F″ will always be in time with the movement of the turret-slide 23 and cross-slides 25 and 26. The shaft 121 is supported at its other end by a sleeve 259 slidably mounted in the housing 20 and held in position by a bayonet-lock connection 259a. By means of a knurled head 259b on the sleeve 259, the latter may be turned to release the bayonet lock and allow the sleeve to be pulled out far enough to permit insertion and removal of the shaft 121, and the assembly thereon, from the machine very quickly through a door 112a on the front of the change speed and feed control box. A spring pressed plunger 259c, within the sleeve 259, forces the shaft 121 tightly against the worm gear 120, as shown in Fig. 13, to take up all end play when the bayonet lock 259a is in locked position.

A feature of this arrangement is that when once the dogs 261 are set for a particular work subject, the control device 112 can be quickly removed from the machine and stored away until such time as the same subject is to be again machined—at which time all that is necessary is to place the tools on their slides and the control device in the machine, thus reducing setting-up time. The only other requirement would be, of course, to see that the proper hand-change gears for the proper "speed" and "feed" are on the machine.

The change-speed control device 112, preferably, in the machine as shown, makes one revolution for each cycle of the machine. Therefore, each disc 260 (A to J and F″) may have a dog 261 (A to J and F″) adjustably clamped in each of the six elongated arcuate slots 260n therein, arranged end to end about the axes of their discs, respectively, corresponding to the six faces on the turret. Of course, as many dogs will be used in each disc as may be required for a given operation of the machine. However, for purposes of clarity, only one dog is shown in the drawings on each disc, except discs 260—A and 260—B which are provided with additional dogs 340 and 342 set in slots 260m (Figs. 13 and 14). The latter slots correspond in number with the slots 260n which receive the dogs 260 (A to J and F″) and the dogs 340 and 342 are offset laterally from the disc to a greater degree, than the other dogs in slots 260n so as to actuate electrical switches 341 and 343, respectively, and which switches control the main motor M, which drives the spindle 21, turret-slide 23 and cross-slides 25 and 26 through the mechanism shown in Figs. 4 and 4a, to start or stop their operation on any turret face of the turret during the cycle of the machine.

Power—for the various operations of the speed-change clutches 39, 40, 41, 42 in the spindle drive (Figs. 4 and 21) of the main feed clutch 87, of the fast travel clutch 94 and intermediate feed clutches 81, 83 and 85 (Figs. 4a and 21)—is transmitted to them through balls 262—A to 262—J, which actuate, through a system of levers, connectors 39c, 40c, 41c, 42c, 87c, 94c, 81c, 83c, and 85c, (here shown as cables) which operate said clutches, respectively. Each of the balls 262 (A to J) is held in inoperative position by ball releasing means 270, one of said means for each ball; and each of said releasing means 270 is actuated by a dog 261 (A to J) respectively. Thus, the four automatic spindle speed changes are controlled by the dogs 261—A, 261—B, 261—C and 261—D on discs 260—A, 260—B, 260—C and 260—D, respectively; the start and stop of fast travel or quick idle motions and of the feed motions of the turret slide and cross slides are controlled by dogs 261—E, 261—F and 261—G on discs 260—E, 260—F and 260—G, respectively; and the three automatic feed changes are controlled by dogs 261—H, 261—I and 261—J on discs 260—H, 260—I and 260—H. As can be seen particularly in Figs. 13 and 15, there is no ball provided individually for disc 260—F″ and its dogs 261—F″, which latter actuate a slide-bolt 307 to release a spring loaded impeller 305 (Fig. 15) for only moving the clutch cone 96 from engagement with the fast travel clutch 94 to neutral position, as will be hereinafter described under sub-heading "Start and stop feed and fast travel for turret and cross-slides." However, a connection 311 (Figs. 13 and 15) may be provided whereby, when bolt 307 is withdrawn to release plunger 305, ball 262—F is also released to assure that cone 96 does not engage main feed-clutch 87, as will also later appear.

*Ball box transmission mechanism*

There is only one ball 262 (A to J) controlled by each of the dogs 261 (A to J) respectively. Each of these balls is disposed in an individual raceway and, when released by its releasing mechanism 270, Fig. 14, moves into its raceway and makes a substantially circular path to a pocket 275p where it is retained by the release mechanism until again released by the operation of a dog on a corresponding disc 260. The present ball box mechanism is a further development of United States Patent No. 2,225,886.

To this end the shaft 126, shown in Figs. 3, 4a, 13, 14 15 and 17, is driven constantly during operation of the machine from constant speed quick motion motor 100 and has keyed thereon a plurality of collars 271 corresponding in number to the number of balls 262 (A to J). Each collar is provided with one radially projecting and bifurcated or slotted finger-lobe 272 that carries the ball 262 around its raceway, the lobes on said collars being aligned (shown in Fig. 13) for timing purposes, except the lobes which are actuated by the change "feed" balls 262—H, 262—I and 262—J and which are staggered in relation to each other for purposes later explained. It is conceivable that in some instances all the lobes may not be aligned.

Spacers 273 are interposed between each of the collars 271 and are of greater diameter than the collars, thus forming therewith, together with the inner wall 274a of the casing 274, a substantially circular and definite raceway 275 for each of the balls 262 (A to J) respectively. The collars 271 and spacers 273 are rigidly clamped to the shaft 126 by means of a nut 276. Preferably, the upper portion of the casing 274 forms an offset chamber communicating with the raceways and in which is disposed a comb member 277 spaced from the walls of the casing 274. This comb member has pick-up projections 278 thereon spaced from each other so that one of said projections will extend into each of the raceways 275, respectively, and aligned to pass through bifurcation of the lobe 272 in such raceway. The comb is also formed with a plurality of spaced lateral flanges 279, each positioned to lie in the same plane with one of the spacer members 273, respectively, to provide individual ball-retaining pockets 275p. The comb has an upwardly inclined surface on the ball receiving side of the pocket and a substantially vertical wall on its ball discharge side, which latter cooperates with a complemental surface of said offset chamber to provide a drop-throat 275t for said pocket and from which the ball is discharged by gravity into its raceway. Thus, it will be seen that when a ball is released from its position shown in Figs. 13, 14, 15 and 17 it will drop into the raceway 275 and be carried by its lobe 272 around the raceway for a distance of approximately 270°, at which point it will be guided and, by its own momentum, will move over the comb 277 into the pocket 275p where it will be retained in the pocket by its releasing mechanism 270, until the releasing mechanism is actuated by dog 260 on the disc corresponding to said ball.

Each of the releasing mechanisms, heretofore referred to, comprise a pin 270 slidably mounted in a bore in the casing 274 and positioned to be normally projected by a spring 280 into the drop-throat 275t in the path of the ball so as to prevent the ball from dropping from said throat into the raceway 275. Each of pins 270 is operated by one of plurality of shifting levers 281 fulcrumed at 282 and substantially bell-crank in form, these having a suffix capital letter corresponding to the disc and dogs thereon which operate the same. One arm of each lever 281 is positioned between spaced bearing abutments 283 on an end of the release pin 270 projecting exteriorly of the casing 274; and the other arm of said lever is weighted and overlies the corresponding discs 260 so that a yieldably mounted striker 284 positioned thereon will normally lie in the path of its associated dog or dogs 261 on its disc 260. The extremities of the weighted arms of the shifting levers 281 (A to J and F') extend through vertical elongated slots 285 in the door 112a (Figs. 1, 3, 14, 15 and 17) of the casing 20 to provide keys K, whereby the balls 262 (A to J) may be manually released at will.

For quick changing of said clutches, the balls 262—A to 262—J must make only one travel around their respective raceways 275. To insure this as well as against other possible accidents, a check-pin 270' is provided which is similar to and overlies the release pin 270, so when its forward check-end projects into the pocket 275p, it will hold the ball on top of the comb 277, which top surface is slightly inclined toward the drop-throat 275t. The check-pin 270' is biased to have its forward check-end normally lie out of the pocket 275p by spring 287. The construction is such, as shown, that when a ball release pin 270 is withdrawn from its normal position, shown in Figs. 13, 14, 15 and 17, it actuates a teetering lever 286 pivoted on a bracket and having its ends in engagement with the ends, respectively, of pin 270 and the check-pin 270', so as to move the forward end of the latter into the pocket 275p and prevent the ball, after being released in the raceway 275, from re-entering the drop-throat 275t (and thence into the raceway) before the dog 261, which released the ball, moves out of engagement with the striker 284 (or the key K is manually released) to allow the spring 280 to move the pin 270 to its normal ball holding position, as shown.

To prevent a jam—that would be caused by a ball 262 and its lobe 272 on the shaft 126 arriving at a position where a line through center of radius on end of the lobe 272 and passing through center of the ball and intersecting the surface of drop-throat 275t at or about 90°—a discharge check 288 is provided in the bottom of the throat of each pocket 275 and is in the form of a yieldable block slidably mounted in a recess in the casing 274 below the release pin 270, said slide block being normally urged into said throat by a spring 289 into engagement with the perimetal edge of its adjacent associate spacer 273. The perimetal edge of the spacers 273 is, preferably, a true circle throughout its major portion except for a distance immediately preceding the lobe 272, where the circle is interrupted for a distance but continued on a smaller radius as indicated at 273', thus forming a depression in the perimeter of the spacer having a convex or arcuate surface. Consequently, when a slide block 288 is contacting the perimeter of the spacer 273 on its major radius, the block is pressed against the spring 289 into the housing 274 sufficiently to allow the ball to drop through the throat 275t into the ball race 275; whereas, when the block 288 contacts the smaller radius 273' of said perimeter, it is projected further out into the throat 275t by the spring 289 to hold the ball back in said throat until the lobe 274 has passed beyond the throat. Then, when the lobe 272 has passed and the larger radius on the spacer 273 has again pressed the block 288 sufficiently back into the housing, the ball will drop behind the lobe into the ball race 275; whereupon, the next revolution of the lobe will engage the ball and carry it in its course through the race and discharge it into the pocket 275p, as above described.

While the comb 277 and the balls 262 are shown vertically over the ball race, they may be placed in any other position. For instance, if the comb is placed in a horizontal or lowered position, the ball would then roll over the comb by gravity and the speed of the shaft 126 could be lowered, if desired.

Now, the oscillatory levers 263', 263², 264, 265', 265² and 265³ will be described (Figs. 13, 14, 15 and 17) and which levers are actuated by said balls 262—A to 262—J and which levers in turn actuate rocker-levers 266', 266², 267, 268', 268² and 268³, respectively. These oscillatory levers are loosely mounted on shaft 290, preferably, disposed under the ball box casing 274 and carried in brackets 291 depending from the end portions of the ball box casing 274. The rocker-levers are loosely mounted on the shaft 269 carried in a suitable stationary portion of the frame or housing 20 and each has one end portion connected to the distal end of their associated oscillatory levers by a pin and notch connection 294 for quick disconnection, while its opposite arm is, preferably, substantially Y-shaped, to each extremity of which is attached a cable, above mentioned. The construction of certain of the oscillatory levers, however, differ from each other due to the functions they perform and may be divided into three different groups as indicated by their main reference numbers.

The two levers 263' and 263² cause the speed changes of the spindle (which latter also drives the turret-slide 23 and the cross-slides 25 and 26) and reference may be had to Figs. 13 and 14, wherein it is shown that these two oscillatory levers are utilized for engaging and disengaging the clutches 39, 40, 41 and 42 (Fig. 4). These two oscillatory levers 263' and 263² are disposed adjacent each other and each has extending from it at opposite sides of its fulcrum point, respectively, two leg portions. Thus, when viewed in elevation, each lever has a substantially U-shape appearance and journalled on the shaft 290 at its intermediate or closed end portion, the two legs being offset with respect to each other to lie in different planes transversely of the shaft 290. The legs of these levers extend through slots 293 in the bottom of the ball box casing 274. The lever 263' has one leg 263—A positioned to move into and out of the raceway of ball 262—A and the other leg 263—B positioned to move into and out of the raceway of ball 262—B but disposed on substantially diametrically opposite sides of the shaft 126. The other lever 263², in a similar manner, has its two offset legs 263—C and 263—D positioned so that its leg 263—C is positioned to move into and out of the raceway of ball 262—C and its leg 263—D is positioned to move into and out of the raceway of ball 262—D.

*Operation of spindle speed control*

Consequently, when a dog 261—A on disc 260—A raises (Fig. 14) shifting lever 281—A around its fulcrum 282 withdrawing its release pin 270, ball 262—A will drop in its raceway 275 and its finger-lobe 272, which is rotating at constant speed from motor 100, contacts said ball and carries it around the raceway until leg 263—A is engaged by the ball and moves it out of the ball-path or race, resulting in its lever 263' having moved anti-clockwise on shaft 290 and, in turn, rocker-lever 266, being moved clockwise on the shaft 269. This clockwise movement of rocker-lever 266' pulls cable 42c, guided by suitable sheaves, to rock arm 295 counter-clockwise on stud 296 (see Figs. 4 and 21) whereby yoke block 297 shifts its clutch cone 44 into engagement with clutch 42 and out of engagement with clutch 41 (Figs. 4 and 21).

When a dog 261—B on disc 260—B raises shifting lever 281—B to release a ball 262—B, in same manner as explained in preceding paragraph with respect to the balls 262—A, the finger-lobe 272 in the raceway of ball 262—B, then carries said ball into contact with the leg 263—B, if extending into the raceway of ball 262—B, and moves it out of the path of the ball and simultaneously moves its companion leg 263—A back into the path of its ball 262—A. This movement of the leg 263—B moves its lever 263' clockwise and its rocker-lever 266' anti-clockwise, which latter pulls cable 41c to actuate the rocker-arm 295 clockwise, thereby disengaging the clutch cone 44 from clutch 42 and engaging it with clutch 41.

Likewise, when a dog 261—C on disc 260—C or a dog 261—D on disc 260—D actuates its corresponding shifting lever 281—C or 281—D, respectively, their corresponding balls 262—C or 262—D, the similar operation above described will take place and either cables 40c or 39c will be actuated to move the rocker-arm 298 to shift the yoke 299 to engage the clutch cone 43 with either clutch 40 or clutch 39 and disengage the other.

It will be recognized that any one of the combinations of the above described change speed operations can be effected manually by the lifting of the keys K of the shifting levers 281—A, 281—B, 281—C and 281—D.

As mentioned above, under the heading "Headstock" subheading "Spindle and spindle drive," the four clutches 39, 40, 41 and 42 are arranged in pairs, each pair being served by a single double-acting cone 43 and 44, respectively, so that when one clutch of a pair is disengaged the other clutch of the same pair is engaged. By this arrangement four automatic changes of spindle speed is obtained in the manner above described under said heading. Therefore, since two of the four clutches 39, 40, 41 and 42 must be engaged to obtain any one "speed" and since when the clutch of one pair is engaged the opposite clutch of the other pair is disengaged and since only one leg of either "speed" levers 263' and 263² can be in their respective ball raceways at any one time, should the machine be automatically or manually operated through error or should all four of the keys K of shifting levers 281—A, 281—B, 281—C and 281—D be operated simultaneously all that would take place is a change in spindle speed and its accompanying ratio effect upon the said movements of the turret slide and the cross slides if said slides be in operation. This is a safety feature.

*Start and stop feed and fast travel for turret and cross slides*

As is well understood in the art, with this type of machine, the fast travel for idle movements of the tool slides thereof—which in this case is derived from the fast travel motor 100 when the clutch 94 (Fig. 4a) is engaged and the main feed clutch 87 is disengaged—is desirable to move the turret and cross slides back from cutting position and then again forwardly, after the turret has been indexed, if indexing is employed, to cutting position, at which time the fast travel or quick motion is discontinued and the movement of the slides then proceeds with relatively slower motion during the cutting operations, commonly known as the "feed."

As explained above, the cross slides 25 and 26 of the present machine derive their motion directly from the motion of the turret slide 23, should either or both of said cross slides be selected for operation, as also above explained. In this machine the turret slide actuating means (i. e. the disc cam 135) does not stop during the indexing movement of the turret, when the slide is in its rearmost position, this indexing taking place during a dwell in the cam path 135a.

When the motors M and 100 are operating, the starting and stopping of the movement of the turret slide, whether for "feed" or for "fast travel," is accomplished by the dogs on the disc 260—E which engages the fast travel clutch 94, by dogs on disc 260—F which disengage main feed clutch 87, by dogs on disc 260—F' which disengages fast travel clutch 94 through latch device L (and not a ball), and by dogs on disc 260—G which engages main feed clutch 87 and by the ball box mechanism associated therewith, as shown in Figs. 13, 15 and 16. The balls 262—E, 262—F, 262—G, controlled by the dogs on the discs 260—E, 260—F and 260—G, just mentioned, actuate a single oscillatory lever 264 which in turn operates a single rocker 267 which, through its cables 87c and 94c, actuate the main double-acting clutch cone 96 (Figs. 4a and 21) to engage and disengage the main feed clutch 87 and to engage and disengage the fast travel clutch 94, or to move said cone 96 to neutral position which latter also includes the operation of disc 260—F'.

The rocker lever 267 is the same as the rocker levers 266' and 266² but the oscillatory lever 264 is of different construction than the oscillatory levers 266' and 266², in that, in addition to the two legs 264—E and 264—G, which effectively operate to engage the fast travel clutch 94 and the main feed clutch 87, respectively, and correspond identically in form with the legs 263—A and 263—B of oscillatory lever 263', it has an additional shorter leg 264—F which is effectively operated by its ball to move the clutch 96 from engagement with main feed clutch 87 to neutral position and which only partially extends into the race of its ball when the leg 264—E is fully in the race of its ball; these three legs being positioned to move into and out of the raceways of balls 262—E, 262—F, and 262—G, respectively. Also, the lever 264 has an arm 264' projecting therefrom to actuate and be actuated by the spring latch device L, which latter is spring loaded by movement of the arm 264' when leg 264—E engages cone 96 with fast travel clutch 94 and which is released by shifting lever 281—F' to disengage said cone 96 from fast travel clutch 94 and move said cone to neutral position.

The latch device L is disposed on the top of casing 274 (Fig. 15) and comprises a cylindrical sleeve 306 rigid with casing 274 and having a plunger 305 therein and normally urged against an abutment 306a on one end of the cylinder by compression spring 309. A rod 305a has its end portions slidably extended through the plunger 305 and the upper end of the latch arm 264', the end extremities of plunger rod 305a being headed to engage the plunger and latch arm respectively. A spring pressed detent 300 is carried in bracket 300a mounted on cylinder 306 and is positioned to engage in V-shaped notch 301 in distal end of latch arm 264' when the latter is in a position intermediate the full-line and dotted-line positions shown in Fig. 15. When latch arm is in its full-line position, it moves plunger 305 to its full-line position and loads spring 309, and plunger 305 is locked in this position by spring pressed slide-bolt 307, entering groove 308, until released in a manner to be explained. When so released, plunger is moved by spring 309 to contact stop abutment 306a thus moving latch arm 264' and its notch 301 to their intermediate position where detent 300 enters said notch. Movement of the latch arm 264' to its dotted-line position, and which may cause rod 305a to move therewith, is allowed by opening 306b in the cylinder 306.

Assume that the machine is at rest with its turret-slide 23 in its rearmost position and it is desired to start the machine with turret-slide approaching the workpiece W in fast travel until the tools on the turret (or cross-slides) reach a point where slower cutting "feed" is required; and, further assume that the fast travel clutch 94 is disengaged with its coacting cone member 96 held in neutral position by the detent 300 (Fig. 15) engaging in V-shaped notch 301 in the distal end of the latch extension arm 264'. With the latch arm 264' in this intermediate position, the leg 264—E extends partially into the raceway of its ball 262—E; and, although the leg 264—F is on the same side of shaft 126 as leg 264—E and rigid on lever 264, it is slightly shorter than leg 264—E also rigid on lever 264 so as not to extend into the raceway of its ball 262—F when its latch arm 264' is in the neutral position just mentioned.

Now a starter push-button (not shown) is operated to close a circuit to the main drive motor M and to the fast travel motor 100 (Figs. 4 and 4a) whereby the spindle is driven, but the turret slide 23 and cross-slides 25 and 26 remain stationary because the main feed clutch 87 is disengaged as its coacting cone 96 is in neutral position as mentioned above, and whereby the fast travel motor 100 rotates the shaft 126 and the clutch 94.

Then by manually lifting key K of shifting lever 281—E ball 262—E is released in a manner above explained, and its finger-lobe 272 rotating with shaft 126 carries the ball to contact leg 264—E moving lever 264 counter clockwise of shaft 290 causing rocker-lever 267 to move clockwise on its shaft 269. Cable 94c anchored at the upper Y-end of rocker-lever 267 moves rocker-arm 302 clockwise on stud 303 (Figs. 4a and 21) shifting cone 96, through yoke 304, from neutral position to engagement with fast travel clutch 94. Thus, the feed shaft 30 is driven through clutch shaft 77 from the motor 100 to move the turret slide at a fast rate of speed and the control dog shaft 121 is driven from the feed-shaft 30. This counter clockwise movement of lever 264 also causes latch-arm 264' to move, to the full-line position shown in Fig. 15, pulling plunger 305 in sleeve 306 so that the spring pressed slide-bolt 307 will enter groove 308 in the plunger and hold the latter against the compression of spring 309. It will be noted that, now, the legs 264—E and 264—F of lever 264 are out of their ball races and leg 264—G is in its ball race, as shown in full-lines in Fig. 15.

In the meantime and since control dog shaft 121 is rotating, dogs suitably placed on disc 260—A, 260—B, 260—C and 260—D, will select the required spindle speed, as above described.

When the turret slide and/or the cross-slides have reached their cutting position, a dog 261—F' on disc 260—F' lifts the shifting lever 281—F' about its fulcrum 282 and by its arm 281' withdraws slide bolt 307 against its spring 310, thereby allowing spring 309 to move plunger against abutment 306a and, hence, the latch arm 264' to its intermediate position where the detent 300 engages in notch 301. This movement is sufficient to cause the lever 264 to operate cable 87c that moves rocker-arm 302 counter-clockwise and, through yoke 304, disengages the cone 96 from the fast travel clutch 94 and moves said cone to neutral position. Also, this movement of the latch arm 264' moved leg 264—E partially into the race of its ball 262—E so that fast travel could be resumed immediately—automatically by operation of a dog on disc 260—E or manually by operation of key K on shifting lever 281—E, if that should be desired.

Whenever the shifting lever 281—F' (which of itself does not control a ball but only the slide-bolt 307) is lifted, either automatically or manually, to shift the cone 96 from engagement with fast travel clutch 94 to neutral position, it always is desirable to operate shifting lever 281—F which releases ball 262—F to contact leg 264—F, should the latter have entered the ball raceway, in order to assure that the cone 96 is not in engagement with main feed clutch 87, the ball 262—F operating to disengage clutch 87, as will be later explained. Therefore, whenever shifting lever 281—F' is lifted the bar 311, secured thereto and extending under portion of key K of shifting lever 281—F, also lift the latter to release its ball 262—F. However, shifting lever 281—F may be lifted independently of shifting lever 281—F' as can be seen.

Now, that the fast travel of the tool slides has been arrested, to carry out the above assumed operation, a dog 261—G will be positioned on its disc 260—G so as to contact its shifting lever 281—G immediately after the shifting levers 281—F and 281—F' have been operated (or it may be simultaneously therewith) so as to release its ball 262—G to contact the leg 264—G, which now partially extends, within its ball raceway, thus moving lever 264 clockwise which moves rocker-lever 267 counter clockwise pulling cable 87c anchored to its lower Y extremity, rocking lever 302 anti-clockwise (in Fig. 21) and, by yoke 304, moving cone 96 into engagement with main feed clutch 87 which, through shaft 77, drives feed shaft 30, and hence the tool slides, at a feeding rate of speed. This feeding rate of speed, however, may be changed further by operation of clutches 81, 83 and 85 which drive through the main feed clutch 87, as will be explained under the next heading.

When leg 264—G was contacted by its ball it was moved completely out of its raceway and both legs 264—E and 264—F were moved into their respective raceways, whereby they may be effectively operated by their respective balls, and the latch arm 264' was moved from its intermediate position to its dotted-line position, Fig. 15.

The tool slides having completed their feeding movement toward the work piece, the next movement is to quickly return them to their rearmost position away from the work piece, at which point the turret slide is indexed to bring another face of the turret opposite the work piece, as is well understood in the art.

This backward fast travel of the tool slides is accomplished by a dog 261—E on disc 260—E raising shifting lever 281—E to release its ball 262—E in a manner explained above. The ball is then carried around in its race by its lobe 272 on shaft 126 and engages leg 264—E, rotating oscillatory lever 264 counter-clockwise, which, in turn, rotates rocker lever 267 clockwise thereby pulling cable 94c to rotate rocker arm 302 clockwise to move clutch cone 96 to disengage main feed clutch 87 and to engage fast travel clutch 94 by reason of the fact that the leg 264—E extended fully within its ball raceway and had sufficient movement to throw the cone 96 from one clutch to the other without stopping in its intermediate or neutral position. It will be observed also that this movement of the leg 264—E moves latch arm 264' to full-line position shown in Fig. 15, at which position the plunger 305 is locked by the slide bolt 307 against the compression of spring 309.

The tool slides, by reason of this operation, travel back quickly from the workpiece to their rearmost position—unless the operation of the entire machine is stopped at this point by dog 342 on disc 260—A engaging stop switch 343 or the movement of the slides is arrested by the operation of the shift lever 281—F' (automatically or manually) to move the clutch cone 96 in neutral position—and will be again moved forward by operation of the disc cam 135 in fast motion toward the workpiece, after the turret has been indexed, as above explained.

Should it be desired to stop the movement of the tool slides, while they are in their slow cutting "feed"—i. e. when the parts 264, 264—E, 264—F, 264—F', 264—G and 267 are in their dotted-line positions shown in Fig. 15—A dog 261—F properly positioned on disc 260—F will raise shifting lever 281—F releasing ball 262—F which will be carried around its race by lobe 272 to contact leg 264—F moving lever 264 counter-clockwise and rocker-lever 267 clockwise sufficiently to pull cable 94c to shift clutch cone 96 out of engagement with clutch 87 to neutral position. This movement of lever 264—because of the shortened ball contact face of its leg 264—F which at any time only partially extends into its ball race—also moves the distal end of latch arm 264 to an intermediate point where the detent 300 engages notch 301 to yieldably maintain the neutral position of cone 96.

*Speed change feed clutches*

It is, of course, desirable and required that the rate of "feed" movements of the tool-slides 23, 25 and 26 be changed for different operations with respect to the rotation of the spindle 21. This is accomplished by change-feed clutches 81, 83 and 85 driven from the spindle and which produce three automatic changes of "feed" which drive the clutch shaft 77 and the feed shaft 30 through the main feed clutch 87, when the latter is engaged by cone 96, as described in connection with Fig. 4a. These clutches 81, 83 and 85 are controlled automatically by dogs 261—H, 261—I and 261—J on discs 260—H, 260—I and 260—J on control shaft 121 and manually by keys K on shifting levers 281—H, 281—I and 281—J, associated with said discs respectively, and which control balls 262—H, 262—I and 262—J, respectively.

This mechanism, shown in Figs. 13, 17, 18, 19 and 20, is the same as previously described, including the ball-release and checking members 270, 270' and 288 and the raceway construction, as can be seen. However, the oscillatory levers 265', 265² and 265³ are different from those previously described; although they are similar to lever 263' and 263², except that lever 265', 265² and 265³ each have only one arcuate extension leg—i. e., 265—H, 265—I and 265—J, respectively—whereas lever 263' and 263² each has two in opposing positions. Each leg 265—H, 265—I and 265—J extends through slots 293 in casing 274 to move into and to be effectively actuated in a counterclockwise direction (Fig. 17) out of their raceways 275 by their respective balls 262—H, 262—I, and 262—J.

Oscillatory lever 265', 265² and 265³ each have a pin connection 294 with the rocker levers 268', 268² and 268³, respectively, which are identical with the rocker levers 266', 263² and 267 and which, in Figure 17, are moved anti-clockwise to cause their respective change-feed clutches 81, 83 and 85 to be engaged when their oscillatory levers are effectively actuated by their respective balls. To this end, cable 81c is connected to the lower Y-extremity of rocker-lever 268' and passes over guide sheaves to rocker arm 312 (Figs. 4a and 21), journalled on stud 313 and connected to yoke 314, to move clutch cone 91 into engagement with first or fine feed clutch 81, while the cable 81d is connected to the upper extremity of the Y-end of rocker-lever 268' and passes over guide sheaves to the other end of rocker arm 312 so as to disengage clutch cone 91 from fine feed clutch 81. In like manner, the Y-extremities of rocker lever 268² are connected by cables 83c and 83d to opposite ends of rocker-arm 315 on stud 316 operating yoke 317 to shift cone 92 into and out of engagement, respectively, with the second or intermediate change-feed clutch 83. Also, in like manner, cables 85c and 85d are connected to extremities of the Y-end of rocker lever 268³ and are connected to opposite ends of rocker arm 318 journalled on stud 319 to operate yoke 320 which moves clutch cone 93 into and out of engagement, respectively, with the third or change-feed clutch 85.

As gears 82, 84 and 86 are constantly in mesh with cluster gears 80, 89 and 90 (Fig. 4a) only one of the feed clutches 81, 83 or 85 should be engaged at one time. To make it impossible to engage more than one of these feed clutches at any time, a mechanical interlocking means R is shown in detail in its several positions in Figs. 18, 19 and 20 and is shown associated with the oscillatory levers 265′, 265² and 265³. This interlock means R may comprise three teeter-levers 321, 322 and 323 journalled at 324, 325 and 326, respectively, in a bracket 327 suspended from ball-box casing 274 and underlying outwardly extending lugs, one on each of the oscillatory lever leg extensions 265—H, 265—I and 265—J. The teeter-lever 321 has its two ends arranged to engage and to be engaged by legs 265—H and 265—J, respectively, while teeter-lever 322 has its two ends arranged to engage and to be engaged by legs 265—H and 265—I; and teeter-lever 323 has its two ends arranged to engage and to be engaged by legs 265—I and 265—J. Thus, if one of said oscillatory levers is effectively actuated by its ball to move clockwise out of the ball race to its dotted-line position (Fig. 17) to cause the engagement of the corresponding feed clutch, it will depress the contiguous ends of its associated teeter-levers (i. e. as leg 265—I has been so actuated as shown in Fig. 18, or as leg 265—H as shown in Fig. 19, or as leg 265—J as shown in Fig. 20) and cause the other ends of said associated teeter-levers to shift the other oscillatory lever legs (265—H and 265—J in Fig. 18; 265—I and 265—J in Fig. 19 or 265—H and 265—I in Fig. 20) counterclockwise to full-line position in Fig. 17, whereby the latter legs move their associated rocker-levers clockwise on shaft 269 pulling cables 81d, 83d or 85d to disengage their respective change feed clutches.

The keys K of shifting levers 281—H, 281—I and 281—J may be lifted by hand to accomplish any desired change of feed manually. To eliminate danger of jamming, if the operator should accidentally operate two or three of feed shifting levers at one time, the finger-lobes 272, which coact with balls 283—H, 282—I and 282—K, are staggered or radially spaced in relation to each other in such a way that one of the lobes will carry its ball to fully operate its associated oscillatory lever legs 265—H, 265—I, or 265—J before the succeeding lobe will have carried their ball to operate their respective oscillatory lever legs. It is preferred to have only one lobe 272 in the raceways of balls 262—H, 262—I, and 262—J; however, it may be desirable to provide more than one lobe in connection with the other raceways that have been previously described.

*Hand cranking*

As is well understood in the art, it is desirable and necessary to handcrank the machine during "setting-up." As previously mentioned, this is accomplished by rotating shaft 118 by means of handcrank applied to the square end 118—A of said shaft and, in this manner, the tool slides may be manually operated. It is absolutely necessary, however, for safety reasons, to have the machine stopped when handcranking and to be unable to start the machine again until the crank has been moved from end 118—A of shaft. To this end, the crank end 118—A of shaft 118 is positioned near the front of the machine and is covered by a cap 328 hinged on the headstock casing 20 (Figs. 1, 3 and 15), the hinge lug of the cap being provided with a cam surface 329 against which one end of a rod 330, slidably mounted in bearings in the housing 20, is held by spring 331. The rod 330 has fast thereon electrical contacts 332 normally held in contact with switch 333 by spring 331, when the hinge cap 328 is closed, the switch 333 being in series with the electrical supply circuit to the spindle motor M and to the fast travel motor 100.

As can be seen from Fig. 15, when the hinged cap 328 is opened for permitting the application of the crank to shaft 118 or for any other reason, the rod 330 is moved inwardly against the spring 331 and actuates bell crank 334 to raise lock pin 335 so that its upper end will extend between the collars 283 of the slidable ball-release pin 270, thereby locking the latter against releasing its ball into its raceway. The lock pin 335 is normally biased by spring 336 to assume the full-line position out of engagement between said collars 283.

There are two of said bell crank levers 334 fast on the shaft 337 and two lock pins 335, one set being arranged along the shaft 337 so that one lock pin will lock the ball-release pin 270 of ball 262—E that causes the fast travel clutch 94 to be engaged and the other to lock the ball-release pin 270 of ball 262—G that causes the main feed clutch 87 to be engaged and thus preventing the spindle or the slides to be motor driven. It is obvious that, when the cap 328 is closed, spring 331 will close switch 333 allowing motor spindle to be actuated and springs 336 will cause their lock pins 335 to unlock their ball-releasing pins 270.

The striker 284 on the shifting levers 281—A, 281—J, and 281—F′ are yieldably mounted, as indicated in Figs. 14, 15 and 17, so as to allow the dogs 261—A to 261—J and 261—F′ to depress the same should a jam of any kind occur in the machine and, particularly, to allow the discs 260—E and 260—G to freely rotate with their dogs thereon, when the shifting levers 281—E and 281—G become locked as a result of the pin 335 entering between the collars 283 on their ball-release pins 270, while the cap 328 is opened during handcranking as explained in the preceding paragraph.

As shown in Figure 5, a lubricating pump 344 may be intermittently operated by the cross-slide selector device S, through projections 345 on the rotatable wheel 235, which projections actuate a spring-pressed trip 346 of the pump assembly mounted in a bracket attached to the bed 24. A coolant pump 347 (Fig. 2) with suitable piping 348 is also provided.

A splash guard 349 (Figs. 1 and 2) may be employed and comprises a hood-like shield having top and side walls and positioned astride the turret-slide 23. The lower edges of the side walls of the guard are equipped with grooved rollers 350 which rest upon and roll over the upper edge of an upstanding flange or outer wall of a chip pan 351 which wall surrounds the base 24 just below the bed-table 24a. Thus the guard 349 may be reciprocated on the chip pan 351 and be moved to a position to enclose the turret 165, cross-slides 25 and 26 and chuck 22 during cutting operations or be moved to a position, indicated in Fig. 1, to expose the same when desired, such, for instance, as when loading or unloading a workpiece.

A chip truck 352 is located in a recess in the base or bed 24 under the chip-pan 351 and to underlie the chuck 22, cross-slides 25 and 26 and the turret (when the latter is in cutting position), the chip-pan having an opening therein commensurate with the chip truck 352. The bottom of the truck is equipped with wheels 353 so that a slight lift on the rear side and with the wheels at its front side, the truck can be wheeled readily out through the rear side of the base.

Having thus described the invention in the manner in which it is to be performed, it is to be understood that the precise construction and arrangement shown and described is susceptible of modification and variation. Therefore, the invention in many respects has been claimed broadly so as to permit such variation and change and, in other instances, more specifically.

That which is claimed as new is:

1. A turret lathe comprising a spindle, cross slides a turret slide, an indexable turret mounted on the turret slide, means for driving said spindle and reciprocating said cross slides and said turret slide relative to the spindle for performing work operations, a device mounted on the turret slide for centering and locking the turret in indexed position and for unlocking the same prior to indexing of the turret, a selector device mounted on the turret slide for rendering either or both of the cross slides effective or ineffective with respect to the position of any face of the turret and including a disconnectible means in said cross-slide drive actuated by said selector device, the means for driving said turet slide including a single rotatably mounted cam-disc disposed under the upper surface of the turret slide and cam surfaces thereon for directly reciprocating the turret slide, for directly indexing the turret, for directly actuating the turret locking and unlocking device and for actuating said selector device in time relation with respect to each other.

2. A turret lathe comprising a spindle, cross slides, a turret slide, an indexable turret mounted on the turet slide, means for driving said spindle and reciprocating said turret slide relative to the spindle for performing work operations, a device for locking the turret in indexed position and for unlocking the same prior to indexing, a disconnectible connection between the turret-slide and cross-slides whereby the latter may be reciprocated from the former, a cross slide selector device operatively connected with said disconnectible means for rendering either or both of the cross slides effective or ineffective with respect to the position of any face of the turret, the means for driving said turret slide including a single rotatable cam member having cam surfaces thereon for reciprocating the turret slide, for indexing the turret, for actuating the turret lock device and for actuating said selector device in time relation with respect to each other.

3. In a machine tool having a bed, a turret slide mounted on ways on said bed, an indexible turret rotatably mounted on said slide, a driven cam-disc mounted on the bed for rotation on an axis perpendicular to the direction of movement of said slide and having an operative connection with the slide whereby the slide is reciprocated, indexing means carried by said turret, a device for locking and unlocking the turret in indexed positions, and means on the cam-disc to operate said device to unlock the turret, to contact with the indexing means carried by the turret to index the turret and to cause said device to again lock the turret in indexed position at a predetermined position of the slide when said disc-cam is rotated, and means for rotating said disc-cam.

4. In a machine tool having a turret slide and cross slides, a driven cam having an operative connection with the turret slide for reciprocating the latter, an operable disconnectible means between the turret slide and the cross slides for reciprocating said cross slides by and from the movements of the turret slide, a cross slide selector mechanism having presettable means thereon and operable to render the disconnectible means between the turret slide and the cross-slides effective or ineffective, and means on said cam for actuating said selector mechanism.

5. In a machine tool having a turret slide and cross slides, an indexible turret rotatably mounted on the turret slide, a driven cam having an operative connection with the turret slide for reciprocating the latter, an operative connection between the turret slide and the cross slide whereby the latter are reciprocated from the movements of the former, a cross slide selector mechanism operable to render the connection between the turret slide and the cross slides effective or ineffective, means on said cam for actuating said selector mechanism, a device for locking and unlocking the turret in indexed position, means on said cam to operate said locking and unlocking device for the turret, to index the turret and to cause said device to again lock the turret in indexed position at a predetermined position of the turret slide.

6. A device as set forth in claim 5, wherein said driven cam is a disc lying in the same plane with and within the turret slide and having a cam path in a surface thereof into which extends a follower carried by the turret slide.

7. A device as set forth in claim 5 wherein the operative connection between the turret slide and the cross slides includes a wedge-cam power transmission means.

8. In a machine tool, a bed having guideways thereon, a substantially flat hollow tool slide having its bottom wall reciprocably mounted in said guideways and having a slot in the bottom wall thereof between said guideways, a cam-disc within said slide and lying in the plane of movement of the slide, a shaft fast to the disc and extending laterally therefrom through said slot and journalled in a bearing of said bed, a gear wheel splined on said shaft, a centering sleeve surrounding said shaft between said gear and said cam-disc and journalled in the bed and receiving in the ends thereof bosses on said disc and said gear, and a drive connection between said disc and said slide for reciprocating the latter.

9. In a machine tool having a turret slide and cross slides movable to and from a workpiece, a multi-faced indexible turret mounted on the turret slide, operable connections between the turret slide and each of the cross slides whereby the latter will be moved to and from the workpiece coordinately with the movement of the turret slide, coupling means for each said cross slide connection and operable to render said connections, respectively, effective or ineffective, relative to any face on the turret, an indexible selector device having a plurality of adjustable dogs thereon corresponding to the faces of the turret to actuate said coupling means of either or both of said cross slides, means for reciprocating said turret slide, means for indexing said turret at a predetermined position of the turret slide, and means for indexing said selector device coordinately with the indexing of the turret.

10. In a machine tool having a turret slide and cross slides movable to and from a workpiece, a multi-faced indexible turret mounted on the turret slide, operable connections between the turret slide and each of the cross slides whereby the latter will be moved to and from the workpiece coordinately with the movement of the turret slide, coupling means for each of said cross slide connections and operable to render said connections, respectively, effective or ineffective, relative to any face on the turret, an indexible selector device having a plurality of adjustable dogs thereon corresponding to the faces of the turret to actuate said coupling means of either or both of said cross slides, a single cam member for reciprocating the turret slide and having means thereon for indexing the turret and said selector device.

11. In a machine tool having a turret slide and cross slides movable to and from a workpiece, a multi-faced indexible turret mounted on the turret slide, a slidable mounted push-rod for each of said cross slides and extending adjacent the turret slide, latch members one for each push-rod to establish a positive connection between its rod and the turret slide or to break the same to operate the cross slides from the turret slide or render them idle, a cross slide selector device comprising an indexible member having a plurality of dogs thereon corresponding to each face of the turret to actuate the latch member of either or both of said cross slides, means for reciprocating said turret slides, means for indexing said turret at a predetermined position of the turret slide, and means for indexing said selector device coordinately with the indexing of the turret.

12. In a machine tool having a turret slide and cross slides movable to and from a workpiece, a multi-faced indexible turret mounted on the turret slide, a slidable mounted push-rod for each of said cross slides and extending adjacent the turret slide, a latch member for each push-rod to establish a positive connection between its rod and the turret slide or to break the same to operate the cross slides from the turret slide or render them idle, a cross slide selector device comprising an indexible member having a plurality of dogs thereon corresponding to each face of the turret, operative connections between each latch member and said indexible member and each connection including a shiftable rod biased to have one of its end urged in the path of said dogs to actuate the latch member of either or both of said cross slides, means for reciprocating said turret slide, means for indexing said turret at a predetermined position of the turret slide, and means for indexing said selector device coordinately with the indexing of the turret.

13. A machine tool as set forth in claim 12 wherein said ends of the shiftable rods are cut-away on one side thereof and the dogs are correspondingly cut-away, whereby when a dog is in one of its positions it will not be ineffective on at least one of said shiftable rods.

14. A machine tool as set forth in claim 12 wherein said ends of the shiftable rods are cut-away on one side thereof and the dogs are correspondingly cut-away, whereby when a dog is in one of its positions it will not be ineffective on at least one of said shiftable rods, and wherein the cut-ends of said shiftable rods are reversely arranged, respectively, whereby when one dog is in one position to actuate one shiftable rod it will be ineffective on the other shiftable rod.

15. In a machine tool having a turret slide and cross slides movable to and from a workpiece, a slidable mounted push-rod for each of said cross slides and having a slidable connection with the turret slide, latch members one on each push-rod to establish a positive connection between its rod and the turret slide or to break the same thereby to operate the cross slides from the turret slide or render them idle, a cross slide selector device for actuating said latch members, means enabling slippage within limits between said latch members and their push-rods, when the former are connected with the latter, to actuate the latch member of either or both of said cross slides, means for reciprocating said turret slide, means for indexing said turret at a predetermined position of the turret slide, and means for actuating said selector device coordinately with the indexing of the turret.

16. A machine tool as set forth in claim 15 wherein the positive connection between each latch member and its push-rod is established and said slippage enabled by the latch member engaging the surface of its push-rod and being slidable thereon until engaging into a notch in its push-rod, said notch having an abrupt stop wall and a chamfered opposite wall forming a bearing surface during the slide retracting movements, and another abrupt stop spaced from said notch and to the rear thereof with respect to the movement of the turret slide.

17. In a machine tool having a spindle, a turret slide and a cross slide, an indexible turret mounted on said turret slide and having a plurality of faces to be selectively presented for cooperative relation with the spindle, a driven cam having an operative connection with the turret slide for moving the latter one full reciprocating movement for each rotation of the cam, disconnectible means between the turret slide and the cross slide for reciprocating the cross slide by the movement of the turret slide, a cross slide selector mechanism mounted to be indexed and having presetable means thereon operable to render said connection between the turret slide and the cross slide effective or ineffective with respect to any turret face to be presented to the spindle, and means on said cam for indexing said selector mechanism once for each revolution of said cam.

18. A machine tool as set forth in claim 9 wherein the tool slide comprises a hollow body member having a slot in its bottom wall extending in the direction of the movement of the slide and having bearing surfaces along the marginal edge portion of said slot which slidably rests on said ways, and wherein the disc-cam is disposed within the said hollow body member of said tool slide and fast upon a shaft extending through said slot.

WILLIAM WALLACE POTTER.
ALFRED JOSEPH FULLER.

REFERENCES CITED

The following references are of record in the file of this patent:

UNITED STATES PATENTS

| Number | Name | Date |
| --- | --- | --- |
| 434,204 | Rothlisberger | Aug. 12, 1890 |
| 1,007,141 | Potter et al. | Oct. 31, 1911 |

(Other references on following page)

UNITED STATES PATENTS

| Number | Name | Date |
|---|---|---|
| 1,074,924 | Austin | Oct. 7, 1913 |
| 1,356,020 | Sellew | Oct. 19, 1920 |
| 1,503,995 | Perkins et al. | Aug. 5, 1924 |
| 1,721,009 | Drake | July 16, 1929 |
| 1,748,540 | Curtis | Feb. 25, 1930 |
| 1,817,668 | Bogart | Aug. 4, 1931 |
| 1,970,276 | Bullard | Aug. 14, 1934 |
| 2,008,010 | Foster | July 16, 1935 |
| 2,156,596 | Lloyd | May 2, 1939 |
| 2,225,886 | Potter | Dec. 24, 1940 |
| 2,255,739 | Curtis | Sept. 9, 1941 |
| 2,263,662 | Wafer | Nov. 25, 1941 |
| 2,264,804 | Lovely | Dec. 2, 1941 |
| 2,281,468 | Van Lammeren | Apr. 28, 1942 |
| 2,334,544 | Curtis | Nov. 16, 1943 |
| 2,347,372 | Silva et al. | Apr. 25, 1944 |
| 2,351,687 | Lange | June 20, 1944 |